United States Patent [19]
Maeda et al.

[11] Patent Number: 5,625,388
[45] Date of Patent: Apr. 29, 1997

[54] OVERWRITABLE OPTICAL RECORDING MEDIUM AND RECORDING METHOD OF THE SAME

[75] Inventors: Takeshi Maeda, Kokubunji; Masahiko Takahashi, Kodaira, both of Japan

[73] Assignee: Hitachi, Ltd., Tokyo, Japan

[21] Appl. No.: 126,766

[22] Filed: Sep. 27, 1993

[30] Foreign Application Priority Data

Sep. 28, 1992 [JP] Japan ............................ 4-257845
Mar. 22, 1993 [JP] Japan ............................ 5-061605

[51] Int. Cl.$^6$ ................................................. G01D 9/00
[52] U.S. Cl. ............................... 346/135.1; 346/74.2
[58] Field of Search .................. 346/135.1, 74.2, 346/74.4, 74.3; 347/241, 256, 262, 264

[56] References Cited

U.S. PATENT DOCUMENTS 5,241,520  8/1993  Ohta et al. ............................ 369/110

FOREIGN PATENT DOCUMENTS 3-41906   of 0000  Japan.
3-156751  of 0000  Japan.

Primary Examiner—Mark J. Reinhart
Attorney, Agent, or Firm—Antonelli, Terry, Stout & Kraus, LLP

[57] ABSTRACT

A recording mark having width (disk radius direction) larger than length (disk rotation direction) is formed by using the light intensity modulation method. The recording mark is ring-shaped. The ring part differs in optical characteristic from a part surrounded by the ring part. In order to form a ring-shaped mark, laser light having predetermined intensity is continuously radiated onto the recording medium. By modulating the intensity of the laser light, information is overwritten. The ring-shaped mark is set to have a width based upon the intensity of radiated laser light and the characteristic of the recording film.

13 Claims, 21 Drawing Sheets

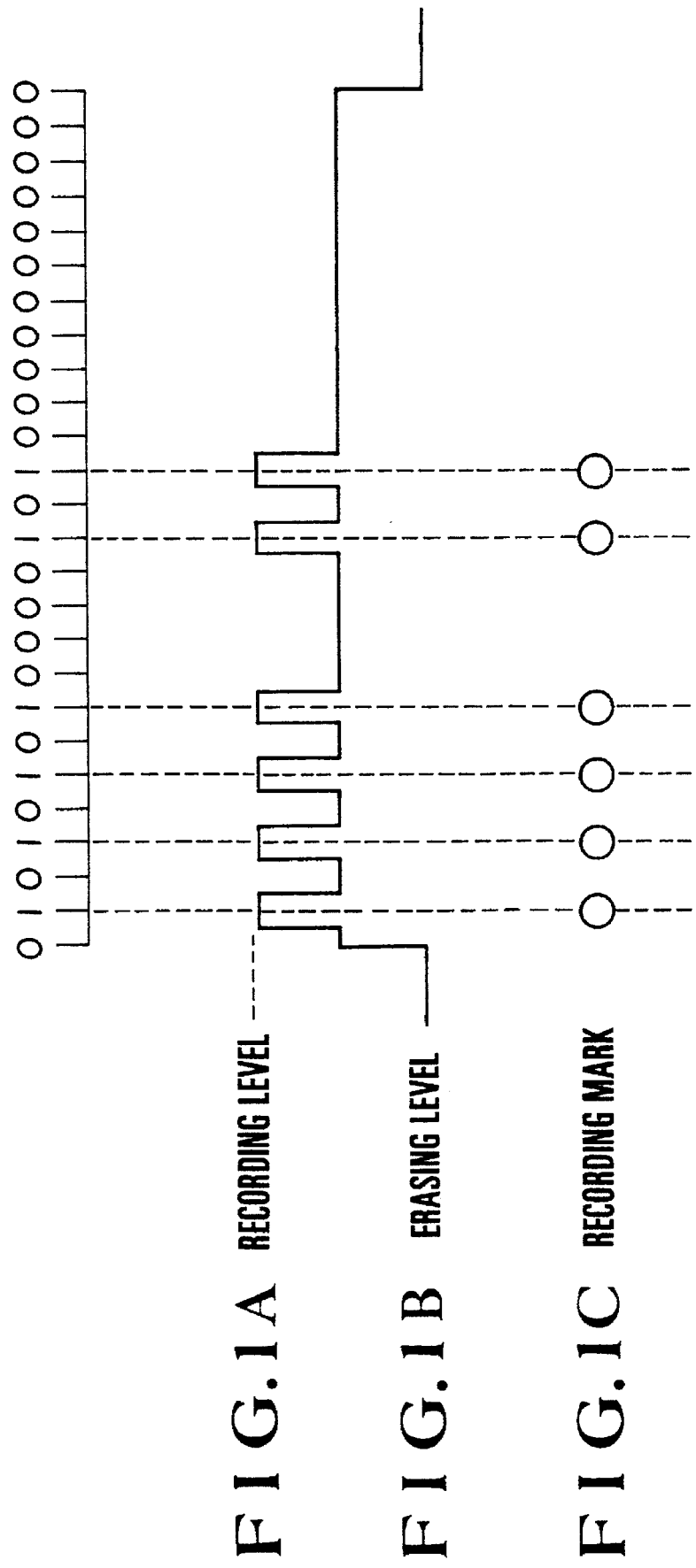

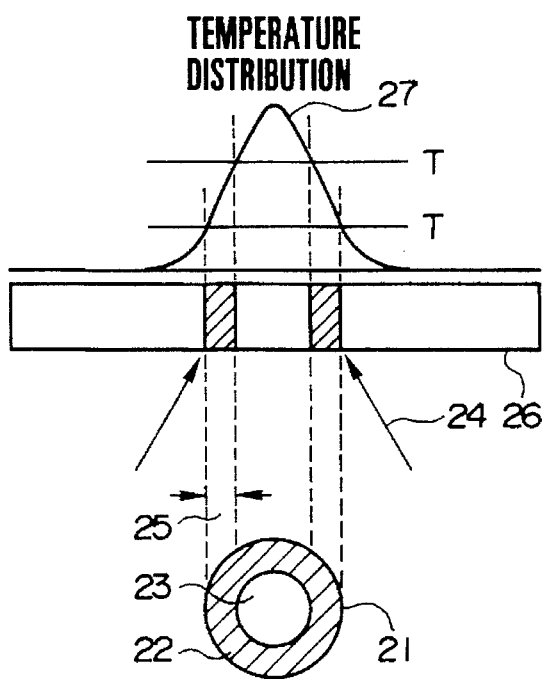
FIG. 2A
FIG. 2B
FIG. 2C
FIG. 2D
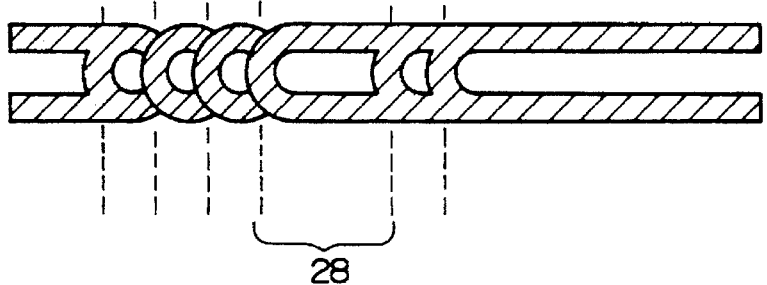

DIRECTION OF MAGNETIZATION

CONSTANT MAGNETIC FIELD

DISTRIBUTION OF TEMPERATURE

CONSTANT MAGNETIC FIELD

LEAKAGE FIELD

MAGNETIZATION STATE PARALLEL TO EXTERNAL MAGNETIC STATE

MAGNETIZATION STATE PARALLEL TO INITIALIZING MAGNETIZATION

MAGNETIZATION STATE FORMED BY THE ABOVE DESCRIBED OPTICAL RECORDING WAVEFORM

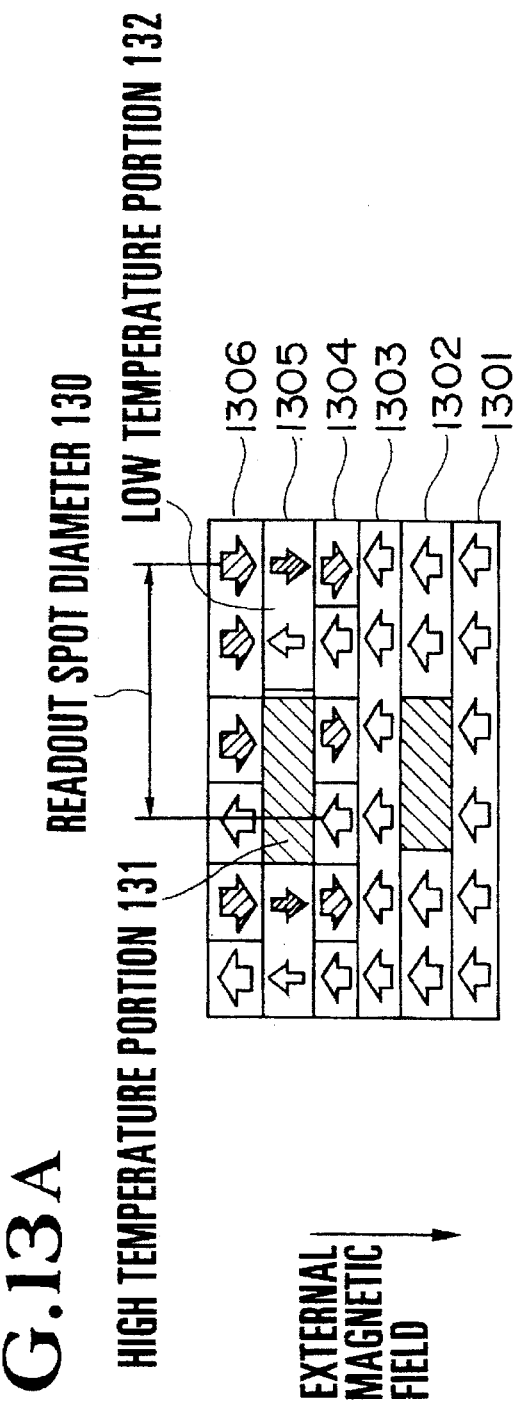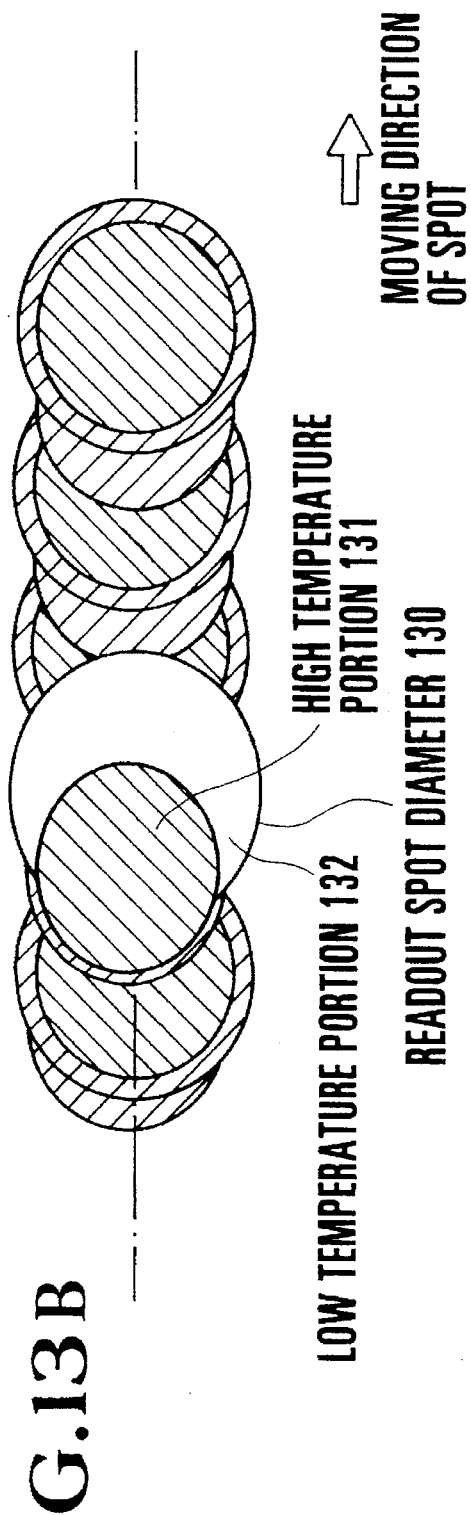
FIG.13A
FIG.13B

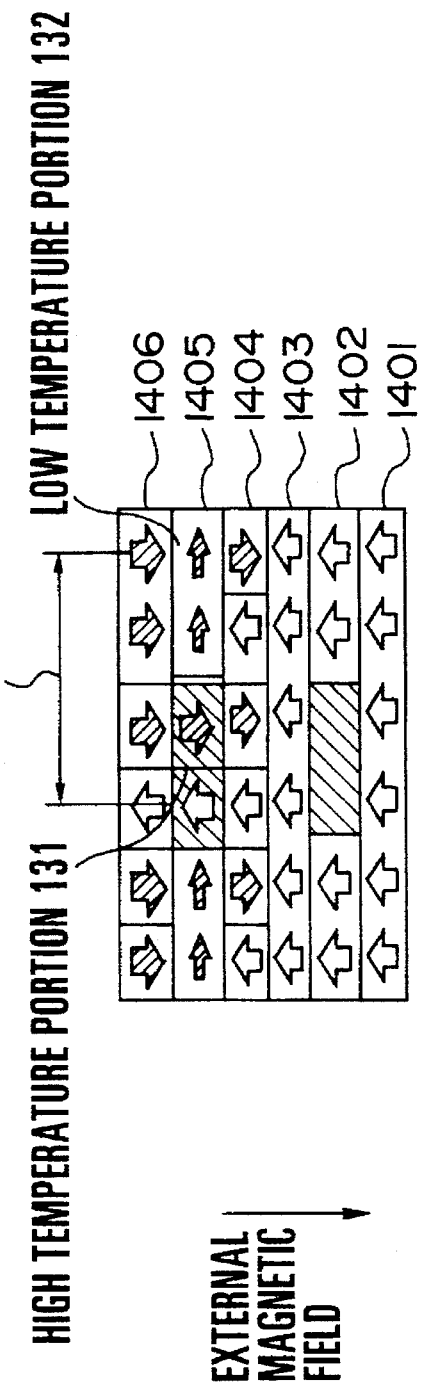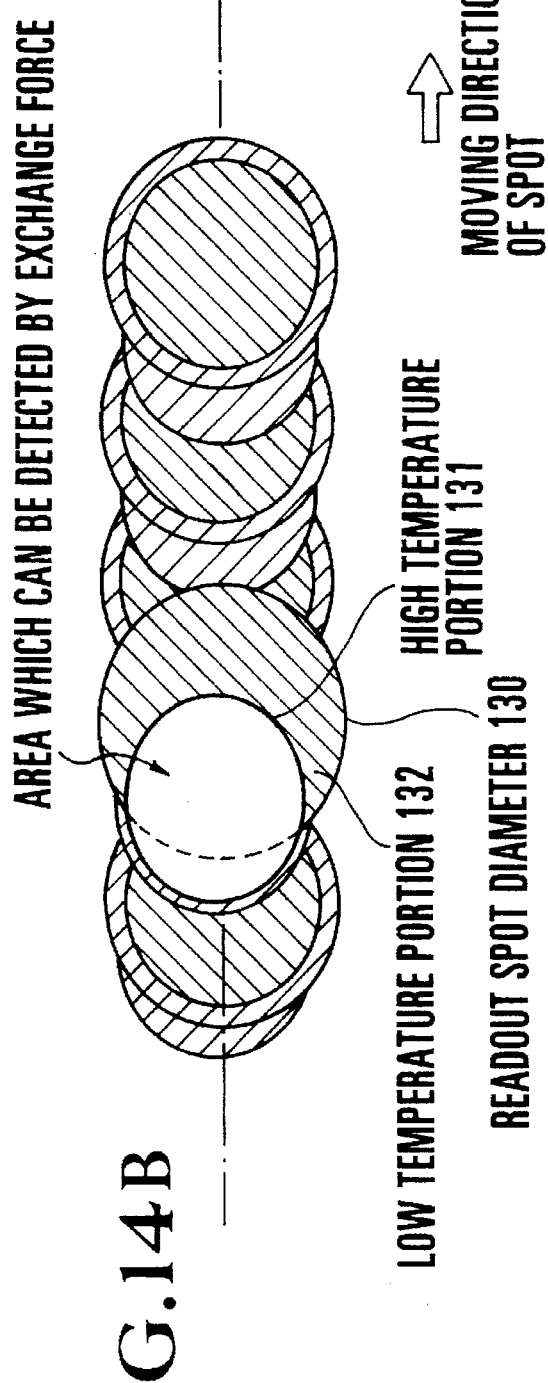
FIG. 14A
FIG. 14B

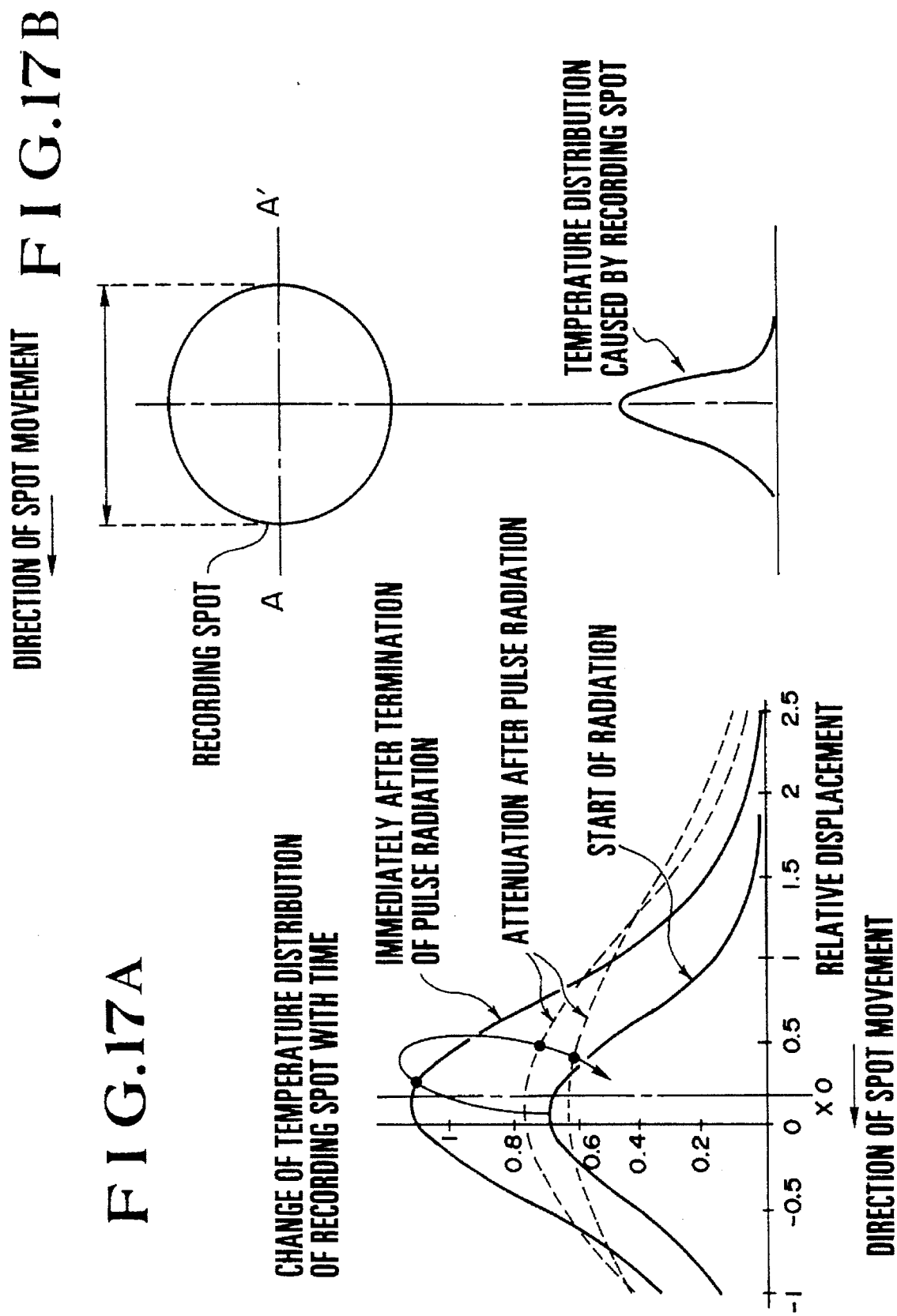

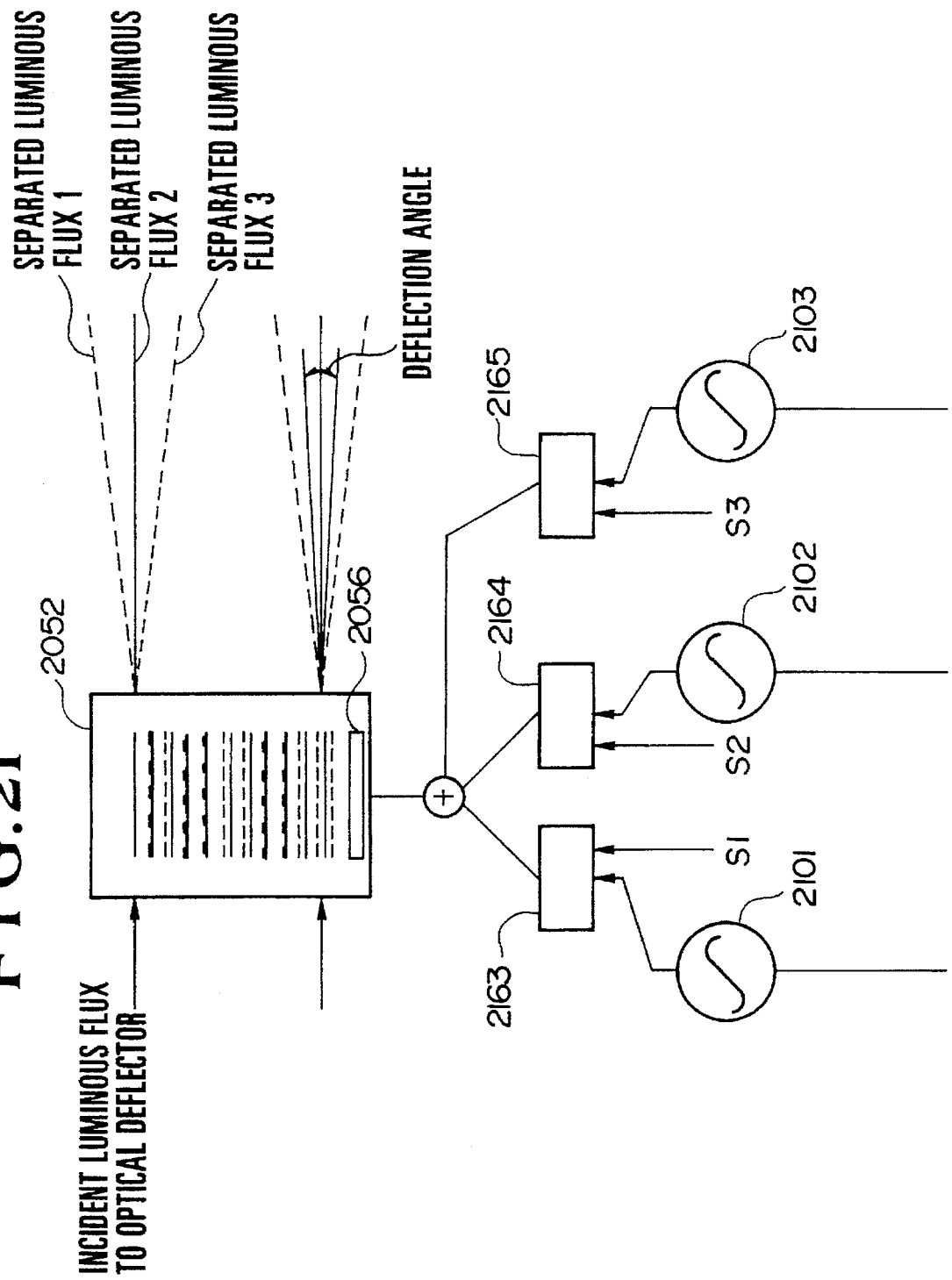

OVERWRITABLE OPTICAL RECORDING MEDIUM AND RECORDING METHOD OF THE SAME

BACKGROUND OF THE INVENTION

The present invention relates to an optical recording medium for recording, reproducing and erasing information by using a laser beam and to a recording method of the same.

Conventionally, in the case that information is recorded on an optical disk, an intensity of laser light is modulated to record a circular or elliptical recording mark. In the pit-position recording method whereby information "1" is associated with the central position of this recording mark, the laser light intensity is increased up to a predetermined power only when a circular recording mark is recorded. For a portion in which information is not recorded, i.e., for a portion of information "0", the laser light is not radiated or intensity of laser light is lowered up to such a degree that a servo such as auto focus or tracking is effected. In the pit-edge recording method whereby information "1" is associated with both edges of a recording mark, the laser light intensity is increased up to a predetermined power only when the elliptical marks of various lengths are recorded. In optical magnetic disks and optical disks of phase change type, the light intensity is increased up to a predetermined power when a mark is recorded, whereas the intensity of laser light is lowered up to power lying midway between the recording power and servo power when a recording mark is erased, i.e., information "0" is recorded.

In any of the recording methods described above, only circular or elliptical recording marks can be recorded so long as a conventional light intensity modulation method is used. As the recording marks become smaller, therefore, the signal to noise ratio significantly deteriorates, higher recording density being hindered. That is to say, in the case that the density in the rotation direction (length direction) of the disk is being increased, shortening the length of a mark simultaneously shortens the width of the mark as well. The magnitude of a signal read out at a light spot is nearly in proportion to the area of the recording mark. If the length of a circular recording mark is halved, for example, therefore, its width is also halved and the signal output is reduced to a quarter. Furthermore, in case of recording using the light intensity modulation, heat generated by the light pulse radiation propagates in the travelling direction of the light spot and affects mark formation made by the next light pulse. Due to such thermal interference, it is difficult to record minute marks consecutively.

As an example of a known technique relating to an optical magnetic recording method allowing the light intensity modulation overwriting operation, JP-A-3-156751, for example, can be mentioned. In this method, an optical magnetic recording medium having an exchange coupling four-layered film is used and direct overwriting is conducted by using the light intensity modulation. According to this method, a ring-shaped recording mark is formed by the self-sharpening effect. However, this is recorded in such a form that the area surrounding the recording mark is erased. Thus a method of actively recording a specific ring-shaped recording mark is not disclosed in JP-A-3-156751.

On the other hand, the recording marks other than circular marks are formed in the magnetic field modulation method for optical magnetic disks. In this magnetic field modulation method, the laser light having such a constant intensity that recording can be conducted is kept radiated and only the magnetic field applied from the outside is modulated to overwrite information. The marks formed at this time are crescent-shaped as described in JP-B-3-41906, for example. Even if the length (track direction) of recording marks is changed in this case, the width (radius direction) does not change. Even if the length of recording marks is halved, therefore, the signal is only lowered to a half. Furthermore, since DC light is radiated, the temperature distribution becomes always constant and the thermal interference described above is absent. Therefore, the magnetic field modulation method is suitable for high density recording.

In this magnetic field modulation method, however, it is very difficult to modulate the magnetic field applied from the outside in the order of several tens of megahertz. If it is dared to be executed, a magnetic field generating device of contact type such as a magnetic head becomes necessary. Thus, there is a problem that interchangeability featuring optical magnetic disks is lost.

In the conventional light intensity modulation method allowing overwriting operation, only circular or elliptical marks can be recorded. As the marks become smaller, therefore, the signal to noise ratio is significantly degraded, the higher recording density being thus hindered. Furthermore, it is difficult to record minute recording marks consecutively under the influence of thermal interference of laser light spots. Furthermore, in the magnetic field modulation method whereby a mark having width larger than its length can be recorded without being affected by thermal interference, it is difficult to attain higher density because of the problem of magnetic field switching speed.

SUMMARY OF THE INVENTION

An object of the present invention is to provide an optical recording method suitable for high density overwriting operation and an optical recording medium for the same, whereby the problems of the above described conventional techniques are eliminated and recording marks wider in the width (radius) direction than in the length (track) direction can be recorded with a high density without being affected by the thermal interference of laser light spots by using the light intensity modulation method.

The above described object is achieved by using a medium allowing an overwriting operation, displacing a plurality of optically discernible recording states by distances smaller than areas occupied by the recording states so that the recording states may overlap each other, updating successively the overlapped areas by using an overwriting function, and deciding nonoverlapping areas to be information areas. To be concrete, the above described object can be achieved by recording a ring-shaped mark which differ in optical characteristic between an outer part and an inner part of an recorded area. In particular, a light having predetermined intensity is continuously radiated to an optical recording medium on which a ring-shaped mark is formed by an inner part and an outer part of the light radiation area respectively assuming different physical states. Only when information is to be recorded, the light intensity is weakened or made equal to zero for a predetermined time. The overwriting operation is thus conducted.

As another method of achieving the object of the present invention, there is a method of overwriting a recording area by using an optical magnetic disk medium allowing an overwriting operation. As in the light intensity modulation overwriting method shown in FIG. 1, recording magnetization states "0" and "1" are recorded individually so as to be separated and the overwriting function is used to overwrite information on data recorded in the past. Therefore, it is necessary to initialize magnetic fields for determining two magnetization states to be recorded whenever information is to be overwritten. In accordance with the present invention, the above described object is realized by applying the magnetic fields for determining two magnetization states to be recorded in a fixed direction on the recording face of the medium at all times, changing the relative distance between the light spot and the medium to change the light intensity, and overwriting an area of an optically discernible recording magnetization state, which is determined by the light spot intensity distribution and the medium recording characteristic.

The light intensity modulation overwriting method will now be described by referring to FIGS. 1A, 1B, 1C. If the method is used and a recording light pulse having a recording level shown in FIG. 3B is radiated in accordance with recording data shown in FIG. 3A, a circular or elliptical recording mark shown in FIG. 3C is formed. There is used a medium having such a recording film that a recording mark is erased when a light pulse having an intensity of a level (erasing level) lower than a recording level is radiated for a predetermined time. That is to say, the light intensity modulation overwriting operation is achieved by radiating light pulses of the recording level and light pulses of the erasing level repeatedly.

The shape of recording marks according to the present invention will now be described by referring to FIGS. 2A, 2B, 2C, 2D. In accordance with the present invention, there is used such a medium 26 that when laser light 24 having a predetermined intensity is radiated for a predetermined time, a ring-shaped mark 21 having an optical characteristic different from that of an inner part of the mark is formed in a predetermined width of a contour part indicating the radiation area (referred to as outer part of the mark). The recording mark is formed so that a ring-shaped outer part 22 may be brought to the recording state whereas an inner part 23 of the laser light radiation area may be brought to the nonrecording state of information. In other words, there must be used such a medium that the inner part 23 and the outer part 22 of the recording mark are in states which are physically different from each other. In this case, the width 25 of the ring-shaped mark can be defined by attained a temperature within the laser radiation area. That is to say, the two temperature values $T_1$ and $T_2$ satisfying the relation represented as "room temperature<$T_1$<$T_2$" are defined as shown in FIG. 2A. If the medium 26 has temperature distribution 27 when laser light 24 is radiated, the area which is higher in temperature than $T_2$ is brought to a physical state identical with that of neighborhood of the light radiation portion. Only the portion 22 on the medium 26, which is higher in temperature than $T_1$ and lower than $T_2$, is brought to a state physically different from that of the neighborhood of the light radiation portion. At this time, the width 25 of the ring-shaped mark is represented in the temperature distribution by a width of temperature difference $T_2$–$T_1$. If information is recorded with recording data 0 as shown in FIG. 2B, continuation of 0 results in radiation of recording light pulses with the recording power level for a long time. Since the temperature of only the outer part of the laser radiation area becomes $T_1$ or above and $T_2$ or below as described above, an area having a different optical characteristic is formed as the recording mark only in the outer part of an elliptic laser light radiation area as shown in FIG. 2D and previously stored information is erased. If at this time the light is turned off for a predetermined time and the intensity is increased again, a portion which is in temperature $T_1$ or below and $T_2$ or above appears within the elliptical area. Eventually, a new ring-shaped mark is recorded in this position, and a semi-ring shaped area 28 is formed. Therefore, by continuously radiating a light having a predetermined intensity and by weakening a light intensity or making light intensity equivalent to zero for a predetermined time only when information is recorded, the overwriting operation can be conducted with a semi-ring shaped recording mark which is longer in the width direction (direction perpendicular to the track) and shorter in the length direction (track direction). Furthermore, in this case, the light of high power is continuously radiated, and the power is weakened only for a short time only when recording is conducted. Therefore, the temperature distribution becomes nearly constant, and the recording can be conducted without being affected by thermal interference.

As for a method of recording a ring-shaped mark on an optical magnetic disk, there is a method of using a leakage field from magnetization around the recording area. As the recording film used for the medium in this case, a Pt/Co magnetic superlattice film having a large leakage field is especially desirable. Furthermore, for recording a ring-shaped mark on the optical magnetic recording medium more certainly, a multilayered film having two or more exchange coupling layers is used. As shown in FIGS. 4A, 4B, 4C, 4D, 4E, the recording film has a three-layered structure having a first perpendicularly magnetized film 41, an in-plane magnetized film 42, and a second perpendicularly magnetized film 43 stacked in order of mention from the substrate. The perpendicularly magnetized film 41 is preferably a film (recording layer) capable of recording (reversing magnetization) with suitable recording power and external magnetic field. The perpendicularly magnetized film 43 is preferably a film (bias layer) incapable of recording with suitable recording power and external magnetic field. The in-plane magnetized film 42 is preferably a switching layer for magnetically coupling the two perpendicularly magnetized films at temperature equivalent to at least a predetermined temperature. As for such a three-layered film, a TbFeCo amorphous thin film or a Pt/Co magnetic superlattice film can be mentioned for the perpendicularly magnetized film 41. An oxide magnetic film or a nitride magnetic film can be mentioned for the in-plane magnetized film 42. A TbCo amorphous thin film can be mentioned for the perpendicularly magnetized film 43. By using an optical magnetic disk capable of recording at a temperature higher than the room temperature and erasing at a temperature higher than the room temperature and lower than the recordable temperature, such as an exchange coupling four-layered film as described in JP-A-3-156751, overwriting using the ring-shaped marks of the present invention can be conducted.

On the other hand, in optical disks of phase change type, the crystal state and the amorphous state are formed depending on difference of attained temperature and hence ring-shaped marks can be recorded. Therefore, the overwriting method of the present invention can be implemented in the optical disks of phase change type as well in the same way.

In FIGS. 3A, 3B, 3C, 3D, a process of recording a ring-shaped mark by using a leakage field is shown. First of all, it is assumed that all directions of magnetization 31 are upward in the initial state (FIG. 3A). By radiating laser light 32 to this film (FIG. 3C), the temperature of the radiation area 33 rises and temperature distribution 34 shown in FIG. 3B is formed. In the outer part of the radiation area 33 at this time, the magnetization is reversed a direction 36 by a leakage field 35 from the surrounding magnetization. This magnetization reversal area begins to be formed from the outer part. Because the leakage field becomes larger as the position is located in an outer portion. In a process of temperature falling of the laser light radiation area (FIG. 3D), the width of this ring-shaped magnetization reversal area 37 becomes wider. When the width has become a predetermined width, however, the magnetization reversal opposite to that of the outer part is caused in the inner part by the leakage field 35 having an opposite direction fed from the area 37. As a result, a ring-shaped recording mark is formed. The width of the ring-shaped recording mark can be adjusted by the magnitude and direction of the magnetic field applied from the outside, or the magnitude of light intensity. The recording film on which such a ring-shaped mark is formed may have a single perpendicularly magnetized film or may have two or more perpendicularly magnetized films. It is especially desirable that the recording film is a Pt/Co magnetic superlattice film having a large leakage field 35.

For recording a ring-shaped mark on an optical magnetic disk more certainly, a multilayered film having two or more exchange coupling films is used. The recording process of a ring-shaped mark in a three-layered film, which is especially desirable among them, will now be described by referring to FIGS. 4A, 4B, 4C, 4D, 4E. As for the structure of the three-layered film, the first perpendicularly magnetized film 41, the in-plane magnetized film 42, and the second perpendicularly magnetized film 43 are stacked in order of mention from the substrate. In FIG. 4A, the initial state of the three-layered film is illustrated. The direction of magnetization of the perpendicularly magnetized films 41 and 43 points opposite to the substrate (upward in FIGS. 4A, 4B, 4C, 4D, 4E). The in-plane magnetized film 42 has been magnetized in the in-plane direction of the film. The perpendicularly magnetized film 41 is a film (recording layer) capable of recording (reversing magnetization) with suitable recording power and external magnetic field. The perpendicularly magnetized film 43 is a film (bias layer) incapable of recording with suitable recording power and external magnetic field. The intermediate in-plane magnetized film 42 is a switching layer for magnetically coupling the perpendicularly magnetized films at temperature equivalent to at least a predetermined temperature. Assuming in this case that the magnetization reversal temperature is $T_1$ in the perpendicularly magnetized film 41, Tm in the in-plane magnetized film 42, and $T_2$ in the perpendicularly magnetized film 43, a magnetic film satisfying the relation $Tm \leq T_1 \leq T_2$ is chosen.

It is now assumed in the initial state (FIG. 4A) that magnetization of the two perpendicularly magnetized films 41, 43 has a direction pointing opposite to a substrate which is not illustrated (i.e., a direction pointing upward). If light is radiated to the films, the temperature of the radiation area rises. First of all, the temperature of the in-plane magnetized film 42 becomes at least Tm. When the sum of exchange coupling force from the two perpendicularly magnetized films 41, 43 and the external magnetic field (illustrated as downward) has exceeded the anisotropy field of the in-plane magnetized film 42, magnetization in the in-plane magnetized film 42 points a direction perpendicular to the plane (i.e., points upward in FIG. 4B). In case of overwriting operation, however, magnetization of the perpendicularly magnetized film 41 points downward in some cases. Therefore, exchange coupling force exerted upon the in-plane magnetized film 42 by the perpendicularly magnetized film 43 must be larger than exchange coupling force exerted upon the in-plane magnetized film 42 by the perpendicularly magnetized film 41. If the temperature further rises, the temperature of the perpendicularly magnetized film 41 becomes higher than $T_1$, and magnetization in the perpendicularly magnetized film 41 points the direction of the external magnetic field (FIG. 4C). At this time, the portion of the perpendicularly magnetized film 41 which is coupled to the area of the in-plane magnetized film 42 having magnetization in the perpendicular direction remains upward in magnetization by the exchange coupling force. Therefore, a ring-shaped magnetization reversal area 45 is formed. In the temperature rising process heretofore described, the temperature of the perpendicularly magnetized film 43 is lower than $T_2$ and hence the magnetization of the perpendicularly magnetized film 43 is not reversed. Furthermore, for forming the ring-shaped magnetization reversal area 45, the spread of heat in the perpendicularly magnetized film 41 must be larger than spread of heat in the in-plane magnetized film 42. Therefore, it is desirable to use, for the in-plane magnetized film 42, an oxide or nitride having a thermal conductivity which is smaller than that of the two perpendicularly magnetized films 41, 43 by approximately one order.

If the temperature falls down from the state of FIG. 4C, the temperature of the perpendicularly magnetized film 41 first becomes $T_1$ or below and ring-shaped magnetic domains are fixed (FIG. 4D). Since at this time the temperature of the in-plane magnetized film 42 is Tm or over, the magnetization remains upward as illustrated. If the temperature further falls and reaches the room temperature state (FIG. 4E), the anisotropy field of the in-plane magnetized film 42 exceeds the sum of exchange coupling force and the external magnetic field and hence the perpendicularly magnetized portion returns to the in-plane direction.

As heretofore described, a ring-shaped mark 44 is formed only in the perpendicularly magnetized film 41. As for the magnetic film having such a three-layer structure suitable for recording a ring-shaped mark (the ring-shaped magnetization reversal area 44), the perpendicularly magnetized film 41 is preferably a TbFeCo amorphous thin film or a Pt/Co magnetic superlattice film. The perpendicularly magnetized film 43 is preferably a TbCo amorphous thin film.

Furthermore, in a phase change optical disk, the crystalline state and the amorphous state are formed by a difference in attained temperature and a ring-shaped mark can be recorded. FIGS. 5A, 5B, 5C show a process for recording a ring-shaped mark in a phase change optical disk. In an initial state (FIG. 5A), a recording film 51 is in an amorphous state. By radiating light 53 to this film 51, the temperature of the radiation area rises and a temperature distribution 52 as shown in FIG. 5B is formed. A portion which has exceeded in temperature a melting point 54 (an inner part 56) is brought to an amorphous state after cooling. A portion 57 which exceeds in temperature a crystallization temperature 55 but which does not reach the melting point becomes crystalline after cooling. In the final state (FIG. 5C), therefore, a ring-shaped mark having an outer part in the crystalline state 58 and an inner part in the amorphous state 59 is formed. The width of this ring can be adjusted by magnitude of the radiation light intensity.

Furthermore, according to another aspect of the present invention, a plurality of optically discernible recording magnetization states by distances smaller than the area occupied by the recording states so that the recording magnetization states may overlap each other. Since the magnetic field determining the recording magnetization state always remains unchanged on the recording face, the update is successively conducted in the overlapping area by overwriting function using a temperature change and a magnetization change. No overlapping areas are fixed as information areas.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein:

FIGS. 1A, 1B and 1C are diagrams showing a recording pulse train and recording marks of a light intensity overwriting method;

FIGS. 2A, 2B, 2C and 2D are diagrams showing a ring-shaped mark, a recording pulse train, and recording marks of a light intensity modulation overwriting method according to the present invention;

FIGS. 13A and 13B are diagrams showing a principle of reproduction for reading out minute marks according to the present invention;

FIGS. 14A and 14B are diagrams showing another principle of reproduction for reading out minute marks according to the present invention;

FIGS. 17A and 17B are diagrams for illustrating a temporal change of a temperature distribution of FIGS. 16A, 16B and 16C;

FIG. 21 is a diagram showing the configuration of a surface acoustic wave element.

DESCRIPTION OF THE PREFERRED EMBODIMENTS

Embodiments of the present invention will hereafter be described in more detail by referring to drawings.

Figure 3A:
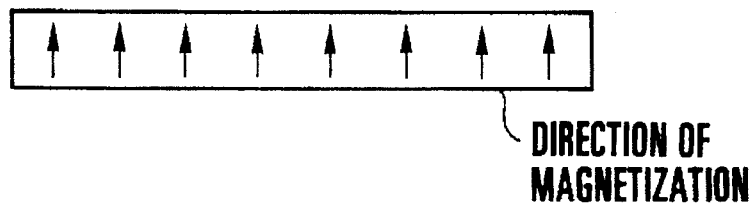
FIGS. 3A, 3B, 3C and 3D are diagrams showing a process for recording a ring-shaped mark on an optical magnetic disk by using a leakage field according to the present invention.
Figure 3B:
Figure 3C:
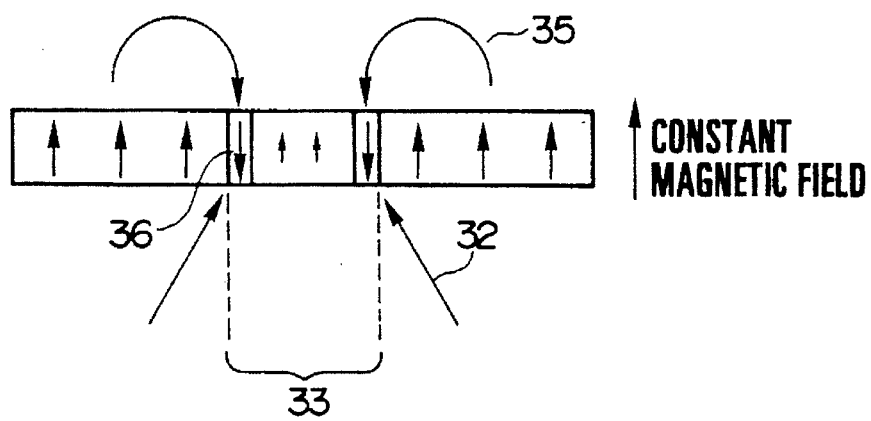
Figure 3D:
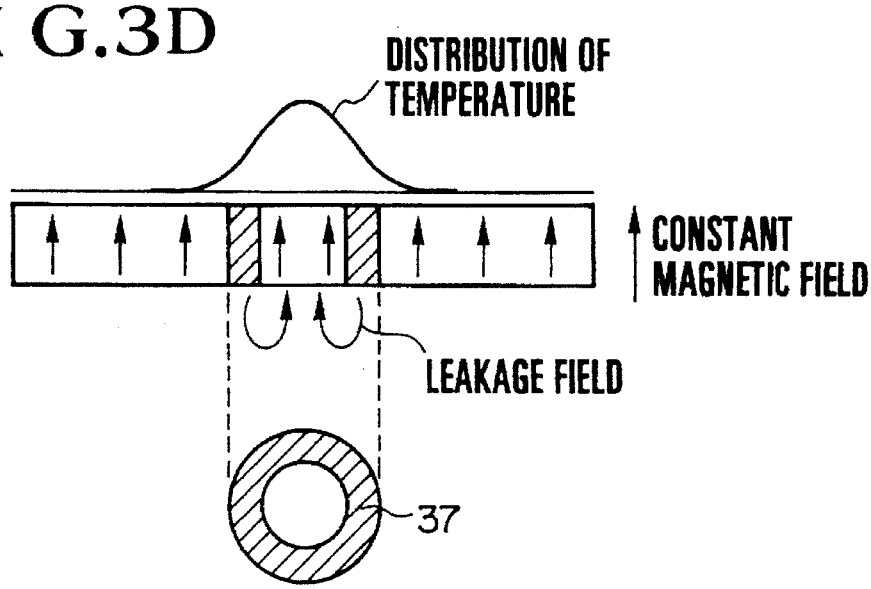
Figure 4A:
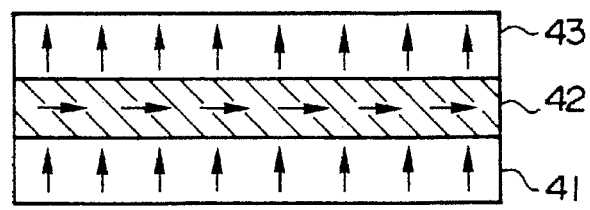
FIGS. 4A, 4B, 4C, 4D and 4E are diagrams showing a process for recording a ring-shaped mark on an optical magnetic disk by using an exchange coupling three-layered film according to the present invention.
Figure 4B:
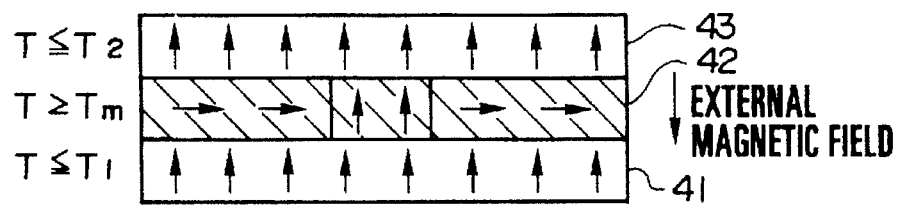
Figure 4C:
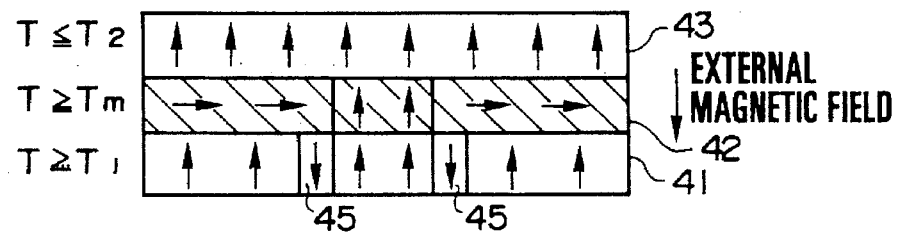
Figure 4D:
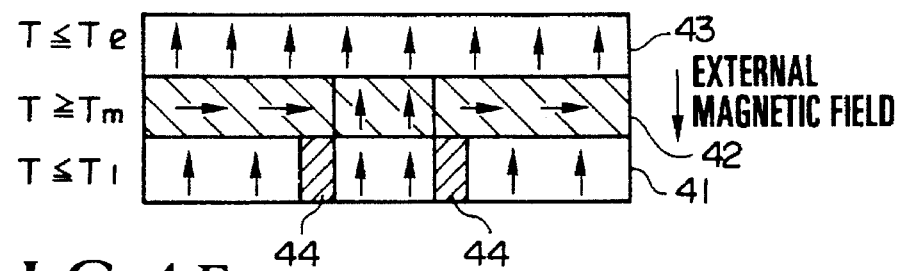
Figure 4E:
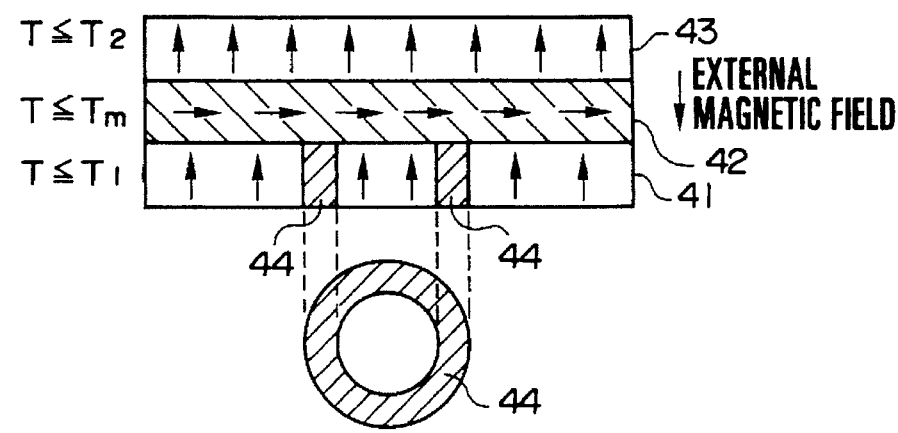
Figure 5A:
FIGS. 5A, 5B and 5C are diagrams showing a process for recording a ring-shaped mark on a phase change optical disk according to the present invention.
Figure 5B:
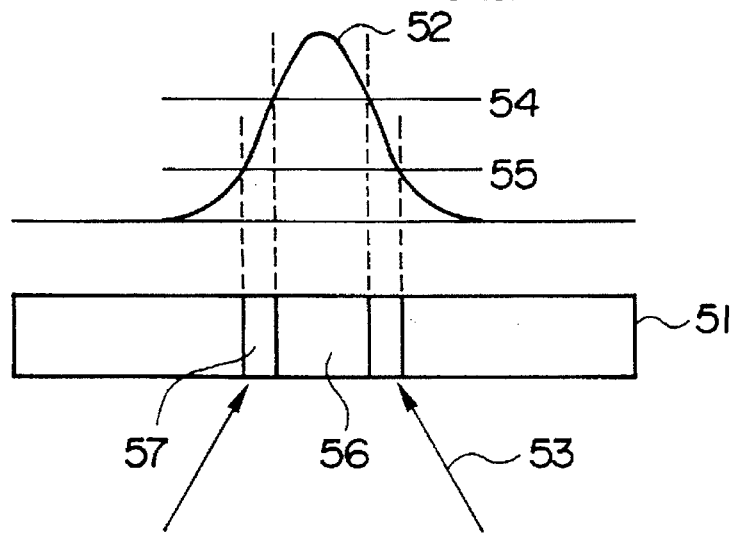
Figure 5C:
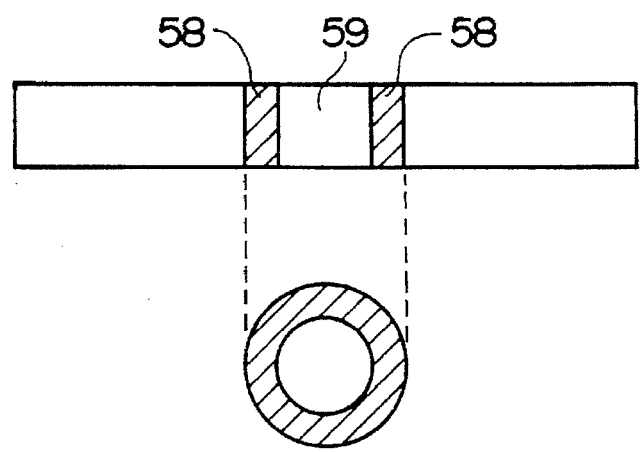
Figure 6:
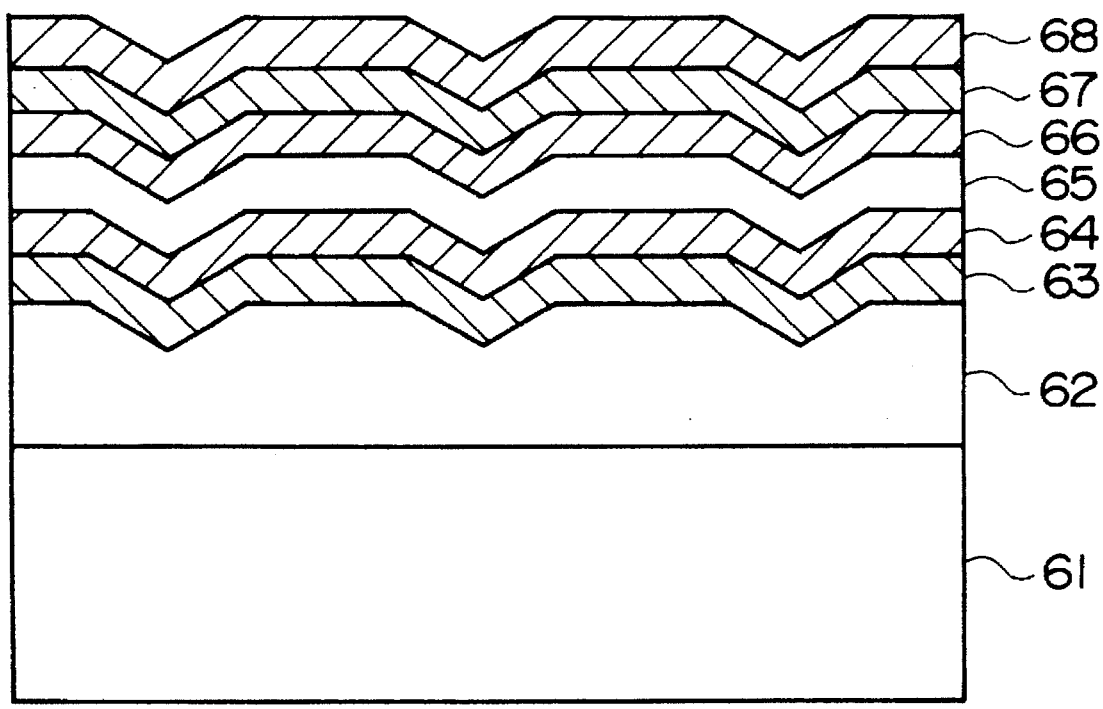
FIG. 6 is a sectional structure diagram of an optical magnetic disk used in the present invention.

FIG. 6 shows a sectional structure of an optical magnetic disk used in embodiments of the present invention. On a glass substrate 61, a UV resin 62 having guide grooves with a 1.2 μm pitch is provided. Further thereon, a SiN film 63, a Pt/Co superlattice film 64, a CoO film 65, a TbCo film 66, a SiN film 67, and an Al film 68 are stacked in order of mention. The Pt/Co film 64 is formed by alternately stacking Pt layers each having a thickness of 0.8 nm and Co layers each having a thickness of 0.3 nm, and the entire thickness of the Pt/Co film 64 is approximately 15 nm.

This disk was initialized so that the magnetization directions of the magnetic film might become the same. Thereafter, a mark was recorded by using a single light pulse having a laser power of 6 mW (with a wavelength of 680 nm) and a pulse width of 40 nsec. The number of revolutions of the disk was 1800 rpm, and the recording radius position was 45 mm. The recording mark formed at this time became a ring-shaped mark having magnetization of the outer part pointing opposite to the surrounding magnetization. The diameter of the ring (the outest part) was 0.8 μm and the width of the ring was 0.2 μm.

Figure 7A:
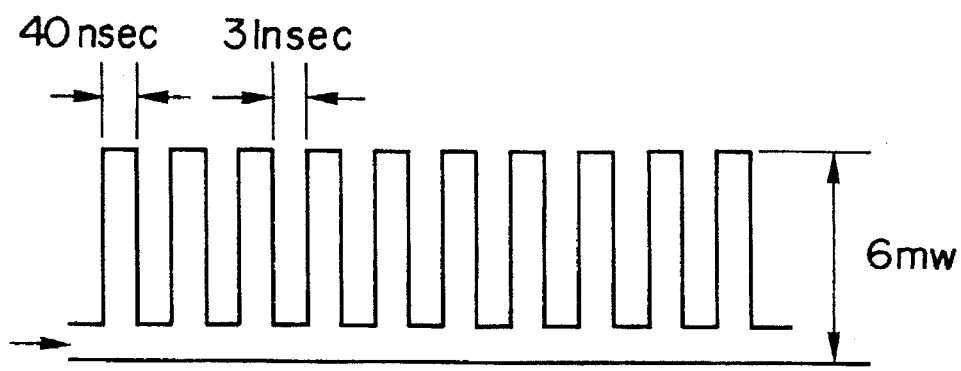
FIGS. 7A, 7B, 7C and 7D are diagrams illustrating a recording pulse train and recording marks for showing light modulation overwriting operation to an optical magnetic disk.
Figure 7B:
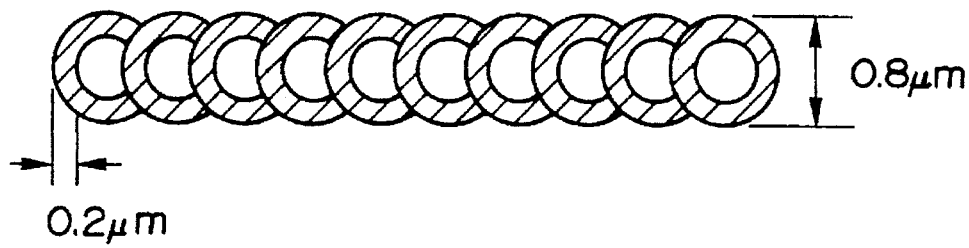
Figure 7C:
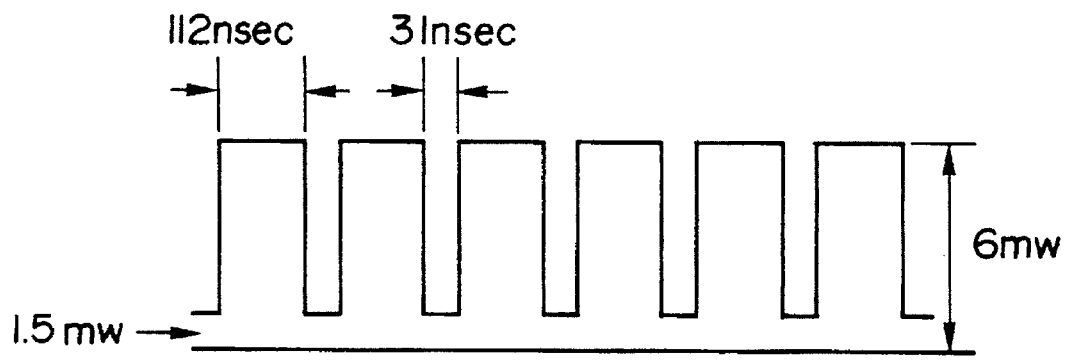
Figure 7D:
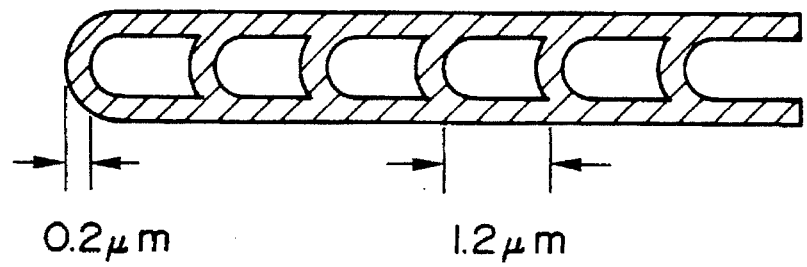

Thereafter, recording was conducted on the condition of consecutive light pulses (with a recording frequency of 14.1 MHz) of the highest power of 8 mW, a minimum power of 1.5 mW, a pulse width of 40 nsec, and a pulse interval of 31 nsec as shown in FIG. 7A. A train of semiring-shaped marks having a mark length of 0.2 μm as shown in FIG. 7B could be consecutively recorded with a pitch of 0.6 μm. When this train of consecutive marks was reproduced by using Ar laser light having a wavelength of 488 nm, the CN ratio was 40 dB. Furthermore, overwriting was conducted on the mark train by using consecutive light pulses (with a recording frequency of 7.0 MHz) having the highest power of 8 mW, a minimum power of 1.5 mW, a pulse width of 112 nsec, and a pulse interval of 31 nsec as shown in FIG. 7C. As a result, a train of semiring-shaped marks having a mark length of 0.2 μm as shown in FIG. 7D could be recorded with a pitch of 1.2 μm. At this time, C/N was 45 dB and the remainder of erasing was −30 dB or less. By using the optical magnetic recording medium and recording method of the present invention, therefore, it becomes possible to record a semiring-shaped mark having a wider width in the disk radius direction even in the light intensity modulation. While ensuring a sufficiently large signal to noise ratio, the recording density can be improved. In addition, since overwriting operation is possible, the optical magnetic recording medium and recording method of the present invention are effective for increase of information recording speed.

Besides the above described three-layer film, the light intensity modulation method exemplified in the present embodiment can be applied to a single-layer film having a suitably large demagnetizing field as well in the same way. At this time, a ring-shaped mark is recorded by a leakage field at the time of recording.

Furthermore, in an optical disk of phase change type, an amorphous area is formed in the vicinity of the center (high temperature portion) of the light radiation area whereas a crystalline area is formed in the periphery. In the same way, therefore, overwriting using ring-shaped marks is possible. No matter whether an optical magnetic disk or a phase change disk is used, high density overwriting using ring-shaped marks according to the present invention can be achieved in a medium allowing recording operation at a high temperature and erasing operation at a low temperature (assumed to be higher than the room temperature).

Another embodiment of the present invention will hereafter be described by referring to FIGS. 8A to 8G, FIGS. 9A to 9E, FIGS. 10A to 10G, FIGS. 11A to 11D, and FIGS. 12A and 12B. In some optical magnetic disks, an exchange coupling multilayered film is used as a medium allowing direct overwriting operation. For example, an exchange coupling two-layered film and an exchange coupling three-layered film have been developed. The exchange coupling two-layered film has a memory layer used for holding and reproducing recorded data and a recording layer for determining the magnetization direction of the memory layer. The recording layer has a Curie temperature higher than that of the memory layer and has small coercive force at the room temperature. In this method, two magnets are needed. One magnet is a magnet for applying a bias magnetic field at the time of recording in the same way as conventional optical magnetic recording. The other magnet is an initializing magnet for aligning only magnetization of the recording layer in one direction without affecting the magnetization of the memory layer. In this method, the recording portion is passed through the initializing magnet before new information is recorded and the recording layer is always initialized. That is to say, magnetic fields corresponding to two recording magnetization states are needed to conduct the direct overwriting operation. The magnetic field generated by the initializing magnet is transcribed to the recording layer. However, it is changed while information to be recorded this time is being overwritten on the data recorded the last time. In this method, a large magnetic field for initialization different from the bias magnetic field must be applied, inevitably resulting in a larger-sized and complicated apparatus.

Since the present invention provides the film itself with the initializing function, the initializing magnet is not required. The recording process conducted when the present invention is applied to an exchange coupling four-layered film will now be described by referring to FIGS. 8A to 8G, FIGS. 9A to 9E, FIGS. 10A to 10G, and FIGS. 11A to 11D. (As for the exchange coupling four-layered film, see JP-A-3-156751, for example.) A memory layer 81 and a recording layer 82 have functions similar to those of the memory layer and the recording layer of the exchange coupling two-layered film. In order to initialize the recording layer 82, a switch layer 83 and an initializing layer 84 are added. The switch layer 83 is a layer for coupling or interrupting the exchange coupling between the recording layer 82 and the initializing layer 84 by using temperature. The initializing layer 84 is a layer for initializing the recording layer. By applying a magnetic field after the initializing layer has been produced, the initializing layer is magnetized uniformly in one direction. In order to prevent magnetization reversal at the time of recording, the initializing layer 84 must satisfy the relation $$Hc4 > Hw4 + Hb \qquad (\text{eq. 1})$$

where Hc4 is the coercive force of the initializing layer; Hw4 is the exchange force exercised upon the initializing layer by an adjacent magnetic layer; and Hb is the bias magnetic field.

The initializing layer 84 has a direction opposite to that of the bias magnetic field in order to prevent reversal of the magnetic moment of the initializing layer 84 from being caused. By exchange coupling force from the initializing layer 84, state transition from downward magnetization ↓ to upward magnetization ↑ is caused in the magnetization state of the recording layer 82. Since this state transition must take place after the magnetization direction of the memory layer 81 is determined, the Curie temperature Tc3 of the switch layer 83 is lower than Tref (i.e., temperature at which magnetization is transcribed from the recording layer 82 to the memory layer 81). The state transition from the upward magnetization ↑ to the downward magnetization ↓ is caused by the bias magnetic field when the temperature has risen to the vicinity of the Curie temperature Tc2 of the recording layer 82. The Curie temperature Tc3 of the switch layer is lower than the Curie temperature Tc2 of the recording layer. Above the Curie temperature Tc3 of the switch layer, the exchange force between the recording layer and the initializing layer is interrupted so that the state transition from the upward magnetization ↑ to the downward magnetization ↓ may be made smoothly. Therefore, Curie temperatures of respective layers satisfy the relation $$Tc4 > Tc2 > Tc1 \geq Tref > Tc3 > Troom \qquad (\text{eq. 2})$$

where Tc4 is the Curie temperature of the initializing layer 84, and Troom is the room temperature.

A light spot is located on a position x1 on an overwriting medium having a recording characteristic heretofore described. Intensity of the light spot is then gradually increased as shown in FIGS. 8A to 8D. As a result, optical energy absorbed into the medium is converted to thermal energy, and the temperature on the medium rises. This temperature distribution has a figure similar to the temperature distribution of the radiated light spot. If the spot diameter is finite, the temperature distribution also has finite extent.

Figure 8A:
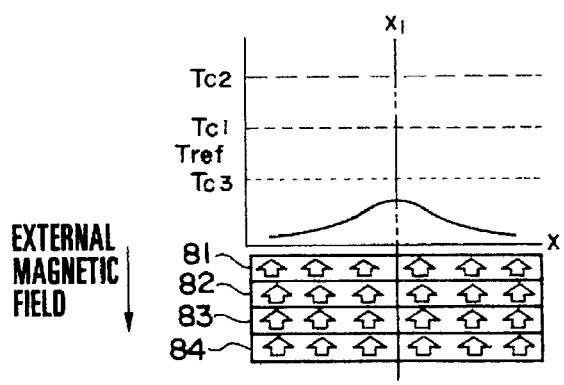
FIGS. 8A to 8G are diagrams showing a recording process of light modulation overwriting operation to an optical magnetic disk according to the present invention.
Figure 8E:
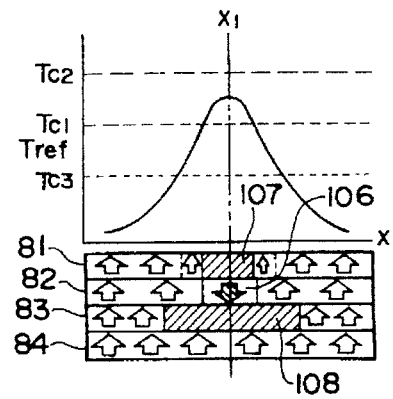
Figure 8B:
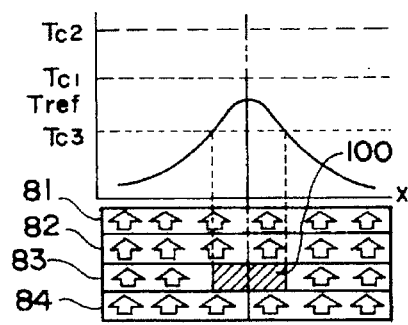

In an initial state, magnetization directions of all layers are made identical with the magnetization direction of the initializing layer 84 as shown in FIG. 8A. If the recording intensity is increased and a higher portion of the temperature distribution exceeds the Curie temperature Tc3 of the switch layer 83 as shown in FIG. 8B, then magnetization of the switch layer 83 disappears in this area 100 and the exchange force between the recording layer 82 and the initializing layer 84 vanishes.

As the light intensity is increased, the temperature rises. If a higher portion of the temperature distribution exceeds the Curie temperature of the memory layer 81 as shown in FIG. 8C, magnetization of the memory layer 81 disappears in this area 101. At this time, the nonmagnetization area 102 of the switch layer 83 becomes larger than the area 101, because the temperature distribution widens toward the end.

Radiated light intensity is further increased, and the temperature rises. If a higher portion of the temperature distribution exceeds the Curie temperature Tc2 of the recording layer 82, magnetization of the recording layer 82 disappears in this area 103. Since the temperature distribution widens toward the end, the size of the nonmagnetization area becomes smaller in the order of the area 104, the area 105, and the area 103 (FIG. 8D). Thereafter the temperature is lowered. If the temperature of the area 103 becomes below the Curie temperature Tc2 of the recording layer 82 (FIG. 8E), this area 103 becomes an area 106, which has the same magnetization direction as the external magnetic field has.

Figure 8F:
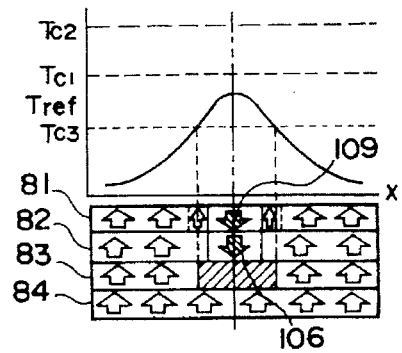
Figure 8C:
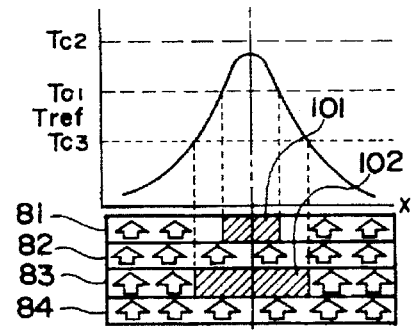

If the temperature is further lowered and the temperature of the memory layer 81 becomes below Tref as shown in FIG. 8F, magnetization is transcribed from the recording layer 82 to the memory layer 81. An area 109 having nearly the same size as the area 106 has and having the same magnetization direction as the area 106 has is formed by exchange coupling force.

Figure 8G:
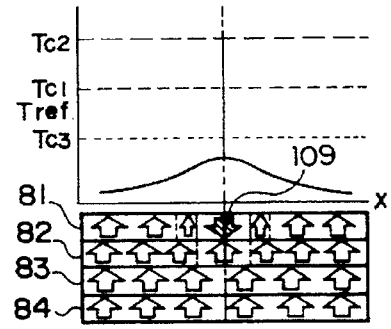
Figure 8D:
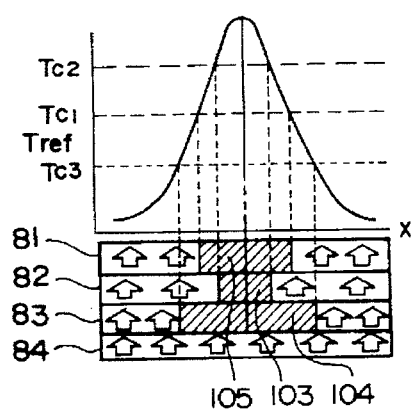

If the temperature on the whole falls below the Curie temperature Tc3 of the switch layer 83 as shown in FIG. 8G, the nonmagnetization area, which has interrupted the exchange force between the recording layer 82 and the initializing layer 84, disappears. The exchange force of the initializing layer is applied to the recording layer 82. The magnetization of the recording layer 82 is forced to have the same magnetization direction as the initializing layer 84 has. The recording layer 82, the switch layer 83, and the initializing layer are restored to their initial states. In the memory layer 81, however, recording magnetization in the area 109 is recorded as information.

Thereafter, on the recording medium having information formed therein as described by referring to FIGS. 8A to 8G, a light spot is located in a position x2 minutely displaced from x1 as shown in FIGS. 9A to 9E. Then the light intensity is increased. However, the optical energy at this time is made weaker than the optical energy at the time of x1, and the highest attained temperature is also made not to exceed the Curie temperature Tc2 of the recording layer 82.

Figure 9A:
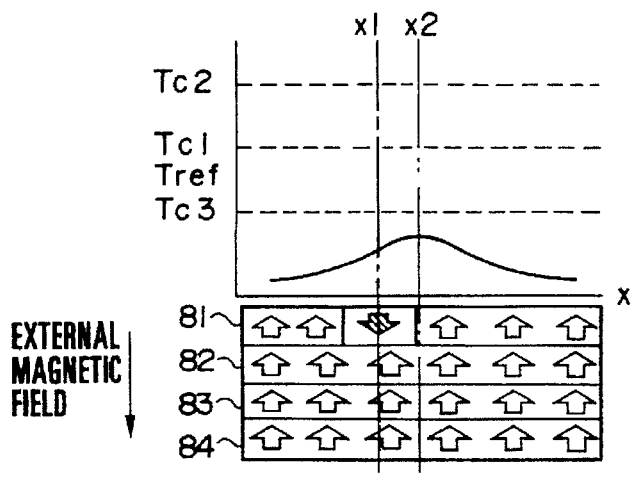
FIGS. 9A to 9E are diagrams showing a recording process of light modulation overwriting operation to an optical magnetic disk according to the present invention.
Figure 9D:
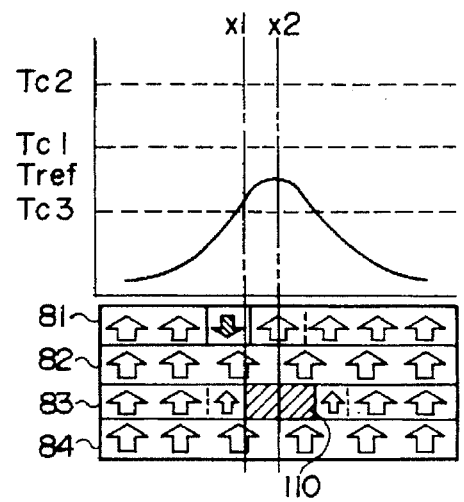
Figure 9B:
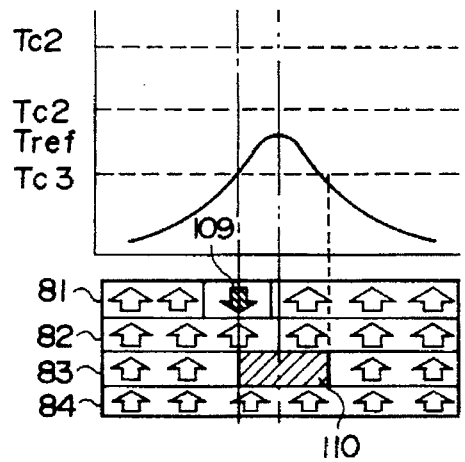
Figure 9E:
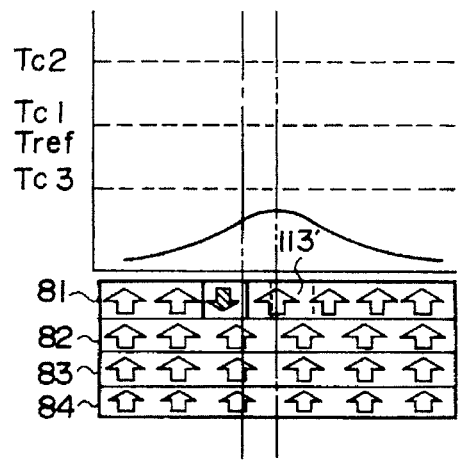
Figure 9C:
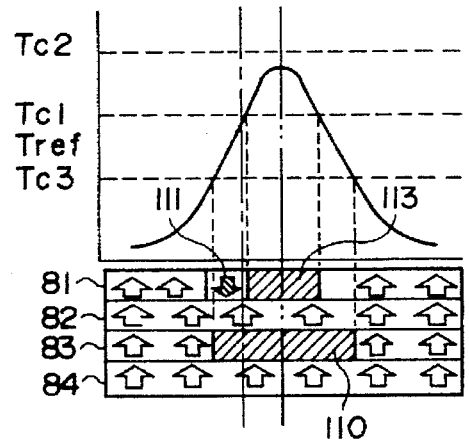

The temperature is raised from the state shown in FIG. 9A. In an area 110 of the switch layer 83, which is higher in temperature than the Curie temperature Tc3 as shown in FIG. 9B, the switch layer is brought to the nonmagnetization state to interrupt the exchange force between the recording layer 82 and the initializing layer 84. The temperature is further raised. If an area having temperature higher than the Curie temperature Tc1 of the memory layer 81 is formed as shown in FIG. 9C, an area 113 of the memory layer 81 is brought to the nonmagnetization state. This area and the information area 109 produced in FIGS. 8A to 8G overlap each other. An overlapping portion is also brought to the nonmagnetization state. In a remaining area 111, magnetization produced in FIGS. 8A to 8G is preserved.

The temperature is lowered from this state. If the temperature of the memory layer 81 becomes below Tref, magnetization is transcribed from the recording layer 82 to the memory layer 81. By the exchange coupling force, magnetization of the area 113 is forced to have the same direction as the initializing magnetization has (FIG. 9D). Thereafter, the temperature is further lowered. As shown in FIG. 9E, the nonmagnetization area in the switch layer 83, which has interrupted the exchange force between the recording layer 82 and the initializing layer 84, disappears. The exchange force of the initializing layer 84 is applied to the recording layer 82. The magnetization of the recording layer 82 is thus forced to have the same direction as the magnetization of the initializing layer 84 has. The recording layer 82, the switch layer 83, and the initializing layer 84 are restored to their initial states. In the memory layer 81, a recording magnetization area different from the recording magnetization area recorded in FIGS. 8A to 8G is thus overwritten on the recording magnetization area recorded in FIGS. 8A to 8G.

Figure 10A:
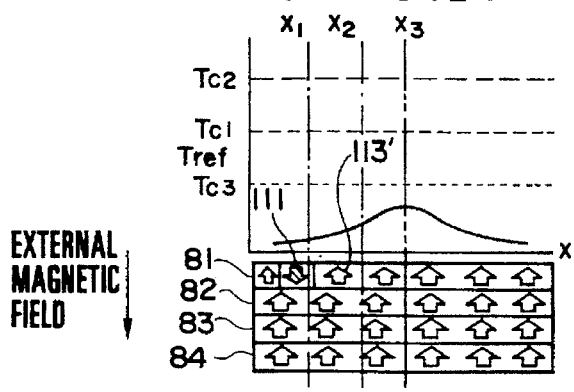
FIGS. 10A to 10G are diagrams showing a recording process of light modulation overwriting operation to an optical magnetic disk according to the present invention, and showing a process for overwriting a different recording magnetization area upon recording magnetization of FIGS. 9A to 9E.
Figure 10E:
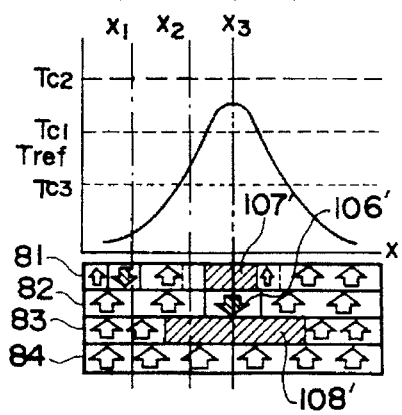
Figure 10B:
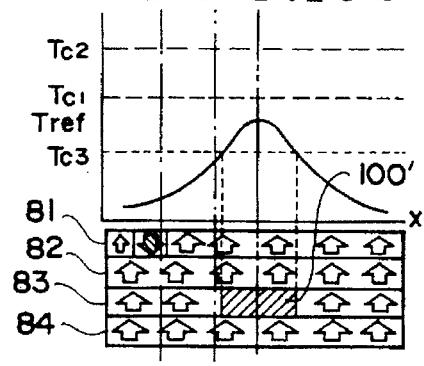
Figure 10F:
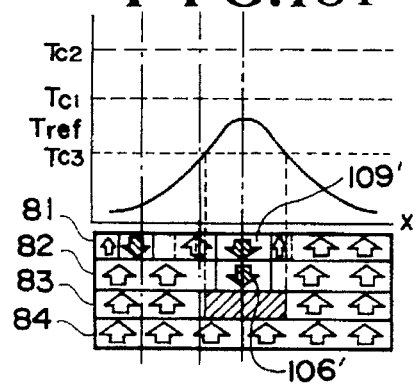
Figure 10C:
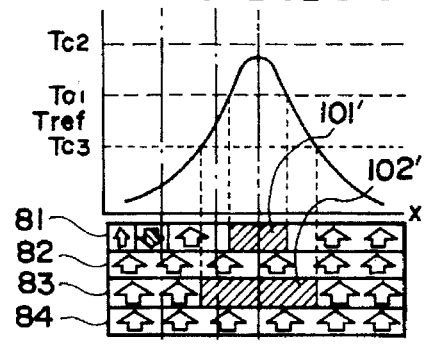
Figure 10G:
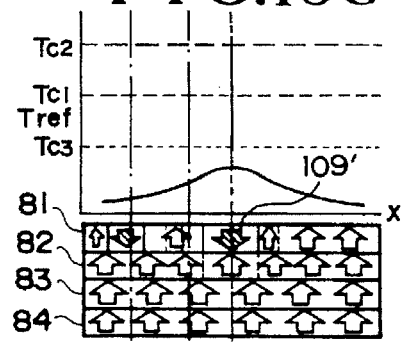
Figure 10D:
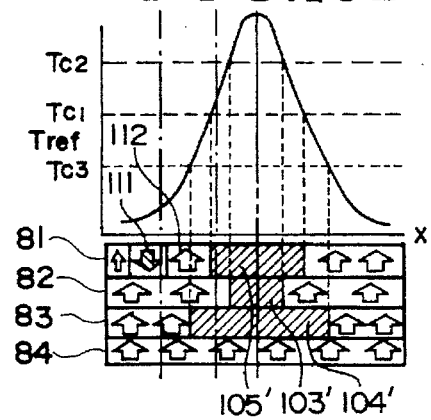

Thereafter, on the recording medium having information formed therein as described by referring to FIGS. 9A to 9E, a light spot is located in a position x3 as shown in FIGS. 10A to 10G. Then the light intensity is increased. However, the optical energy at this time is made larger than x2 in the same way as the optical energy at the time of x1, and the highest attained temperature is also made to exceed the Curie temperature Tc2 of the recording layer 82. As the temperature rises, magnetization of respective layers changes in the same way as the description given by referring to FIGS. 8A to 8G. A magnetization area having a different position but having an identical state as compared with a magnetization area of FIGS. 8A to 8G is denoted by a numeral of FIGS. 8A to 8G provided with a prime ('). It is to be noted in FIGS. 10A to 10G that an area 105' in the memory layer 81, which has been brought into the nonmagnetization state, and an information magnetization area 113' formed on x2 overlap each other as shown in FIG. 10D and the overlapping portion is also brought into the nonmagnetization state. In a remaining area 112, magnetization produced in FIGS. 9A to 9E is preserved.

As described by referring to FIGS. 8A to 8G, the size (diameter r1) of this area 105' is larger than the size (diameter r2) of a nonmagnetization area 103' of the recording layer 82. An area 109' recorded in the memory layer 81 when the temperature is lowered has nearly the same size as the area 103' has. However, a portion 113' of the area 105' in the memory layer 81, which does not overlap with the area 103', is excessively overwritten on the information recorded on x2. However, magnetization of this area 113 has the same direction as the magnetization of the area 112 has. If the width of the area 112 is wider than the width of the area 113, therefore, the area 112 is recorded normally.

Figure 11A:
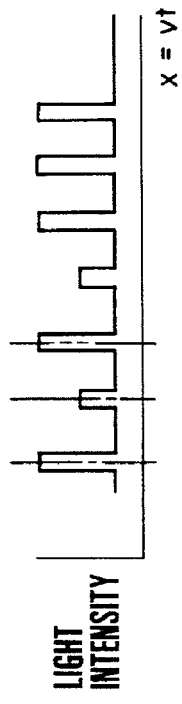
FIGS. 11A, 11B, 11C and 11D are diagrams showing magnetization areas and their magnetization states obtained by applying the present invention.
Figure 11B:
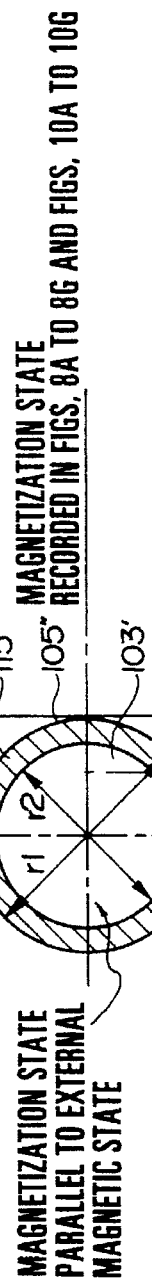
Figure 11C:
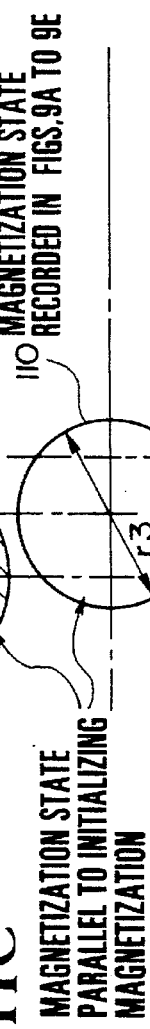
Figure 11D:
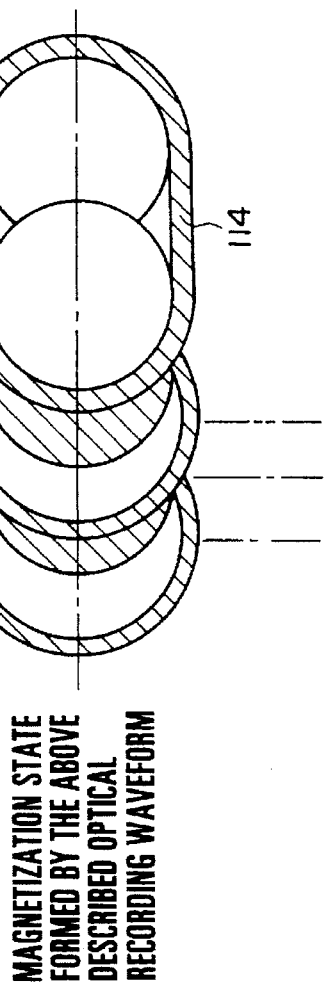

This recording state is two-dimensionally shown in FIGS. 11A to 11D so as to be associated with a recording waveform. It is now assumed that the nonmagnetization area 110 shown in FIGS. 9A to 9E has a diameter of r3. From this, it is understood that the minimum magnetization reversal width cannot be made narrower than the width of the area 113. While the light spot and the medium are being moved at a relative speed v as shown in FIG. 11A, the light intensity is subject to light spot modulation. A resultant magnetization state is shown in FIG. 11D. By consecutively giving light intensity pulses each realizing one magnetization state, an area 114 having one magnetization state consecutively can also be formed. By controlling the light intensity recording waveform by means of a modulation and coding method, therefore, magnetic information of minute marks can be recorded on the medium.

Furthermore, with respect to recording control, another embodiment will now be described. As shown in FIGS. 8A to 8G, the temperature is raised above Tc2 and recording is conducted with the recording magnetic field forced to have the same direction as the external magnetic field has. As a result, a recording area having magnetization parallel to the initial magnetization is generated around the recording area 109 having magnetization parallel to the external magnetic field. This area is represented by 115 of FIG. 11B. In view of the object of the present invention to record minute marks, the area 115 has the same effect as that of the ring-shaped magnetization area in the embodiment described first. Therefore, a recording waveform 121 for generating this ring-shaped structure (so that the highest attained temperature of the temperature distribution may exceed Tc2) is used. The light output is changed in accordance with a data modulation signal 120 shown in FIG. 12A. In a recording position on a medium moving at a relative speed v with respect to the light spot, the above described ring-shaped area is thus overwritten. If the timing interval is widened by the timing of the modulation signal, a magnetization area parallel to the external magnetic field is formed so as to correspond to the interval. On the other hand, by recording with a timing interval corresponding to the ring width, a magnetization area parallel to initial magnetization having a width proportionate to this timing interval is formed. This recording is suitable for the mark length recording method whereby information is recorded as a change of length of the information magnetization area.

Figures 12A, 12B:
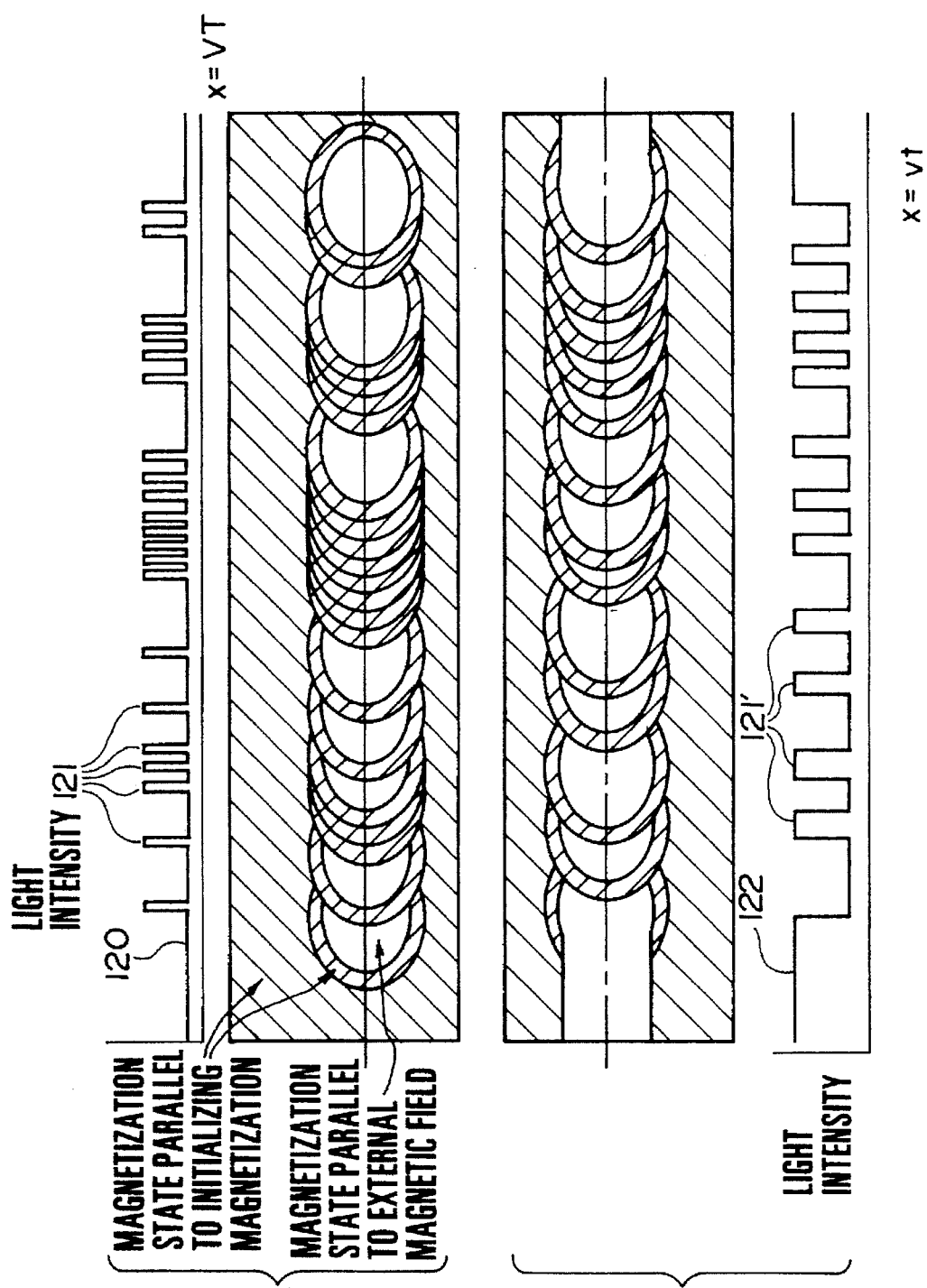
FIGS. 12A and 12B are diagrams showing a recording waveform corresponding to a different ring shape generating method and mark recording method according to the present invention.

Furthermore, in a recording method (such as the mark-position recording method) whereby the position of such a ring area that initializing magnetization does not have long width consecutively but have a fixed width is recorded as information, a recording waveform 121' for generating a ring-shaped structure as shown in FIG. 12B is used and light output is changed according to a data modulation signal 122. Information is thus recorded as the position of the ring width.

An optical disk apparatus having a device for reading out minute marks thus produced with a high signal to noise ratio will hereafter be described. In optical magnetic recording and reproducing operation, there is MSR (magnetically induced super resolution) as a method for reading out a signal from an area smaller than the light spot diameter. This is a method for detecting a minute mark by making the most of the magnetic characteristic of a magnetic film differing depending upon temperature to obtain a super resolution effect. An example in which a magnetic layer having the MSR effect is provided on a disk of the present invention is shown in FIGS. 13A and 13B. A memory layer 1304, a recording layer 1303, a switch layer 1302, and an initializing layer 1301 have the same function as the layers of the embodiments heretofore described. Information is finally stored in the memory layer 1304 as difference of magnetization states. In order to read this information by means of the MSR technique, a memory layer 1306 and a switching layer 1305 are further stacked on the memory layer 1304 from the disk substrate side. In the embodiment, a high temperature portion 131 in a spot 130 becomes a mask covering a mark recorded in the memory layer 1304 at the time of reproduction. A low temperature portion 132 becomes the detection range of the recording mark. A GdFeCo material is used in the memory layer 1306. Designs have been made so as to attain a smaller coercive force, a higher Curie temperature, and a larger Kerr rotation angle. The thickness of this film is chosen so that magnetization of the memory layer 1304 may not be transmitted when the memory layer 1304 is masked. In the high temperature portion, the switch layer 1305 exceeds in temperature the Curie temperature and magnetically interrupts the memory layer 1306 from the memory layer 1304. In the low temperature state, exchange coupling force is exercised and magnetization of the memory layer 1304 is transcribed to the memory layer 1306. This switch layer is made of a TbFe material. The memory layer 1304 is designed so as to hold the magnetization direction stably even if its temperature rises above the Curie temperature of the switch layer. The memory layer 1304 is made of a TbFeCo material. Since the external magnetic field is always applied, this is used at the time of reproduction as well.

FIG. 13A is a sectional view of a medium. FIG. 13B is a top view of the medium. In the low temperature portion whereon the spot begins to be radiated, the memory layer 1306 holds the magnetization direction preceding spot radiation. Because at this time the sum of coercive force and exchange coupling force of the memory layer 1306 becomes larger than the magnetic field supplied from the outside.

Behind the spot, the temperature rises. When the temperature becomes close to or above the Curie temperature of the switch layer, the coercive force of the memory layer 1306 becomes very small and the sum of coercive force and exchange coupling force becomes smaller than the external magnetic field. Under this condition, the magnetization of the memory layer 1306 is forced to have the same direction as the external magnetization has, irrespective of the direction of magnetization of the memory layer 1304. The memory layer 1306 functions to cover the memory layer 1304. FIG. 13B is a top view showing two-dimensional states of marks recorded on the memory layer 1304 in the preceding embodiment and the high temperature portion and low temperature portion of the readout spot. In the present method, only recording marks coming in sight from the low temperature portion contribute to the signal component, and hence recording marks can be detected with high resolution. Furthermore, the width (in radius direction of the medium) of a recording mark is larger than the length (in track direction of the medium) thereof. In addition, the low temperature portion of the readout spot contributing to detection is also narrow in the length direction of the recording mark and long in the width direction. Therefore, the magnitude of the signal is large. Even if the length of the recording mark is made shorter, therefore, deterioration of the signal to noise ratio of the detected signal is slight.

In the foregoing embodiment, however, the low temperature area is convex with respect to the moving direction of the spot, whereas the formed recording mark is concave with respect to the travelling direction of the spot as shown in FIGS. 13A and 13B. Therefore, the signal read out has a high signal to noise ratio, but is distorted in waveform. In order to solve this problem, the memory layer 1306 and the switch layer 1305 of FIG. 13A are provided with the characteristics of the perpendicularly magnetized film 41 (recording layer) and the in-plane magnetized film 42 described first. That is to say, the in-plane magnetized film 42 has function of a switching layer for magnetically coupling the upper and lower magnetized films when the temperature is above a certain value.

Figure 15A:
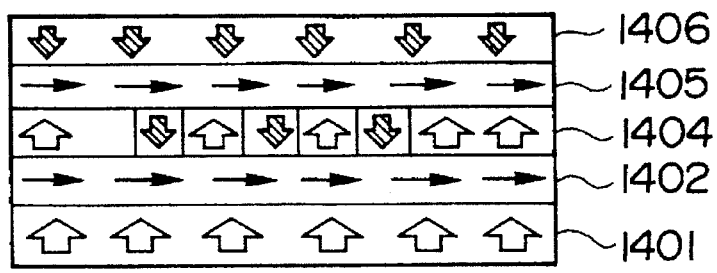
FIGS. 15A, 15B and 15C are diagrams showing still another principle of reproduction for reading out minute marks according to the present invention.
Figure 15B:
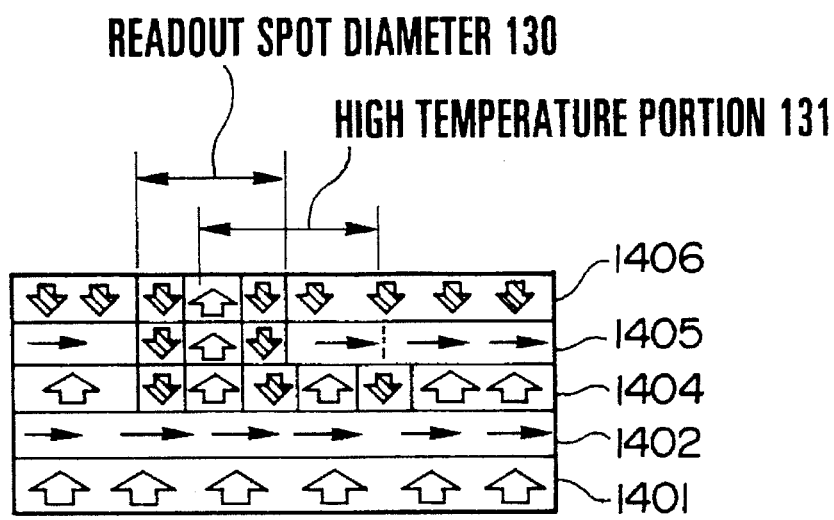
Figure 15C:
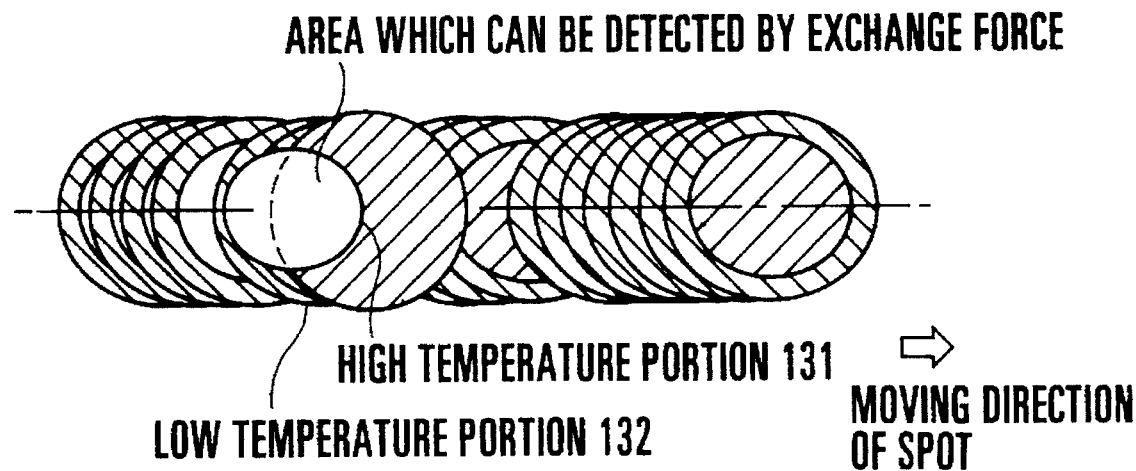

The film structure of this embodiment is shown in FIGS. 14A and 14B. Numeral 1401 denotes an initializing layer, 1402 a switch layer, 1403 a recording layer, 1404 a memory layer, 1405 a switch layer, and 1406 a memory layer. In such a structure, the temperature of the in-plane film becomes above Tm in the high temperature portion 131. Exchange coupling force is exercised from the upper and lower perpendicularly magnetized films. Information of the memory layer 1404 is transcribed to the memory layer 1406. In the low temperature portion 132, however, the exchange coupling force is interrupted by the in-plane magnetization. The range which can be detected by the light spot becomes an area in which the high temperature portion 131 and the spot diameter 130 overlap each other. The range nearly takes the shape of a circle. The diameter of this circle becomes smaller than the readout spot diameter. The resolution is improved. Since there is a portion which becomes concave with respect to the travelling direction of the spot in the same way as the formed recording mark, distortion of the waveform can be reduced. Since the detection area becomes narrow in the width direction of the recording mark, however, the signal to noise ratio of the detected signal becomes lower than that of the foregoing embodiment. In this embodiment, an exchange coupling four-layered film is used to form recording marks. In this portion, however, a ring-shaped recording medium of the present invention already described may also be used. The structure of the medium at this time is shown in FIGS. 15A to 15C.

Furthermore, another embodiment for reducing distortion of the waveform read out will now be described. In both FIGS. 13A and 13B, and FIGS. 14A and 14B, the temperature distribution of the high temperature portion is shifted backward with respect to the travelling direction of the light spot. The reason will be described. Since laser light is directly radiated, heat generated ahead of the spot is propagated backward and added to heat generated behind. Therefore, steady temperature distribution biased backward as shown in FIGS. 13 and 13B, and FIGS. 14A and 14B is formed. The temperature distribution having the high temperature portion on the center of the spot can be realized by conducting radiation for a short time in an AC manner instead of DC radiation as described above. In this case, however, such a distribution can be realized only for a short radiation time. Therefore, recording marks cannot be read consecutively. Accordingly, it suffices to generate recording marks discretely beforehand and detect them discretely at the time of reproduction as well.

Figure 16A:
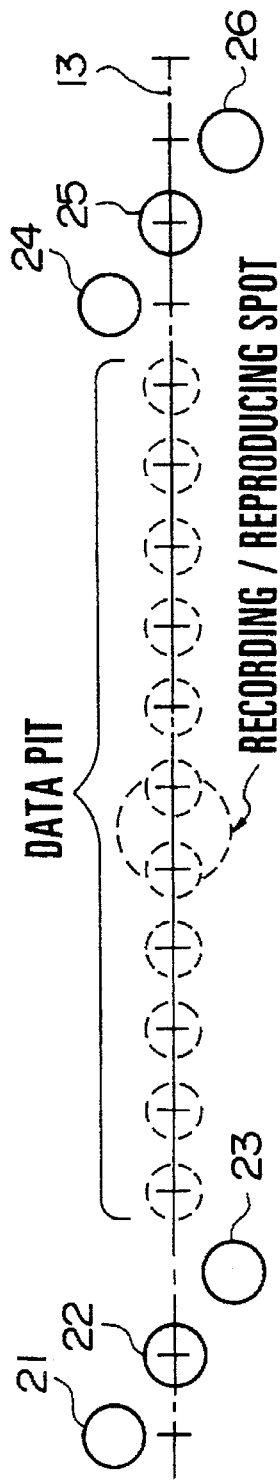
FIGS. 16A, 16B and 16C are operation diagrams for reading marks discretely.
Figure 16B:
Figure 16C:
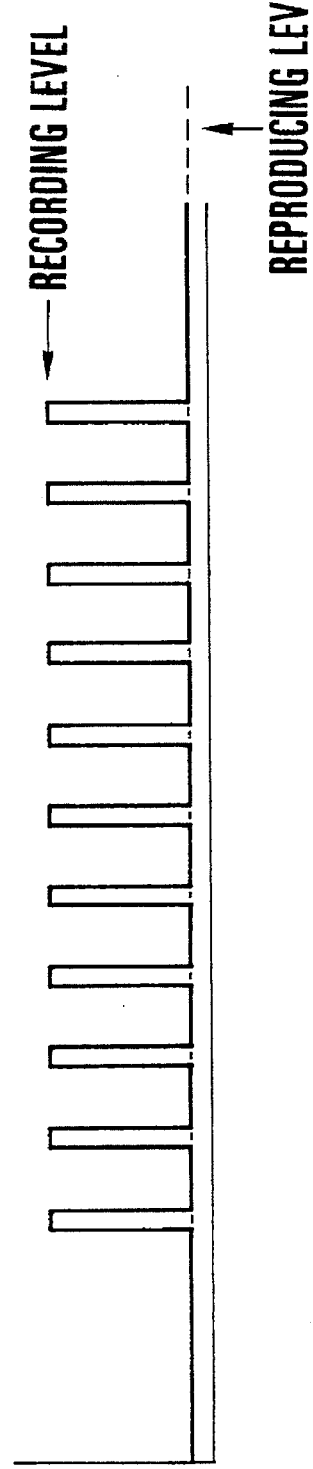

FIGS. 16A to 16C show an embodiment of the present invention. On the disk face, recording tracks are disposed beforehand along a center line 13 of a virtual track extending in a circumference direction at fixed intervals between units of arrangement. At least three optically discernible recording marks 21, 22 and 23 (or 24, 25 and 26) are taken as one unit of arrangement. The at least three optically discernible recording marks 21, 22 and 23 (or 24, 25 and 26) include recording marks disposed alternately on the opposite sides of the center line 13 in the track radius direction and one recording mark disposed on the center of the virtual track. From the at least two recording marks 21 and 23 (or 24 and 26) included in the unit of arrangement and disposed alternately on the opposite sides in the track radius direction, a track deviation detection signal for tracking is detected by using a known method. The light spot is thus positioned on the center 13 of the virtual track. Furthermore, from the recording mark 22 (or 25) included in the unit of arrangement and disposed on the center 13 of the virtual track, a clock 12 is produced as shown in FIG. 16B. The clock is synchronized with the recording mark 22 (or 25) and has timing corresponding to equal intervals obtained by equally dividing the recording mark interval by an integer. By using the clock 12, a recording waveform as shown in FIG. 16C is produced. Recording marks as described in the foregoing embodiment are formed between discrete pits. This recording waveform differs depending upon each embodiment, but is common in that it is a waveform synchronized with the clock produced from discrete pits. The waveform has a light intensity modulation level capable of warming the medium, at the time of reproduction, to a temperature lower than a temperature allowing the recording operation. The waveform has at least one light intensity level changing discretely, which can be raised to a temperature allowing the reproduction operation. The waveform changes intensity with timing synchronized with the above described clock 12. By radiating laser light for a short time, both the front side and the back side become almost symmetric with respect to the travelling direction of the light spot even if the disk and the spot move relatively.

A result of simulation of change of the temperature distribution with radiation time is shown in FIGS. 17A and 17B. Assuming now that the spot diameter of laser is r; the period of radiation is tp; the relative speed is v; and the thermal diffusion constant is D, the center of the temperature distribution is on a point x0, which is at a distance of ½ tp·v from the spot center at the time of radiation start in the travelling direction of the light spot. Assuming now that the distribution during the radiation period is two-dimensional Gaussian, the variance changes with time. If the radiation period is short, the variance during this period is nearly equal to the spot diameter. After the radiation has been finished, the variance increases with time. The variance of the distribution during the radiation period is determined as described above. However, the magnitude can be considered to increase nearly in proportion to the radiation time. As for the temperature distribution after the radiation has finished, the magnitude is also attenuated abruptly due to diffusion of heat and isotropic diffusion is caused. The center of this distribution becomes x0 as described above. By using this method and radiating short pulses discretely, an isotropic high temperature portion can be formed in the center of the light spot.

The above described embodiment is an example in which one light spot is used to control the temperature distribution of the light spot center on the recording medium. In this method, however, only the discrete signal detection can be made. In order to conduct signal detection further continuously, therefore, a plurality of spots are used and their light intensities are changed jointly.

Figures 18A, 18B:
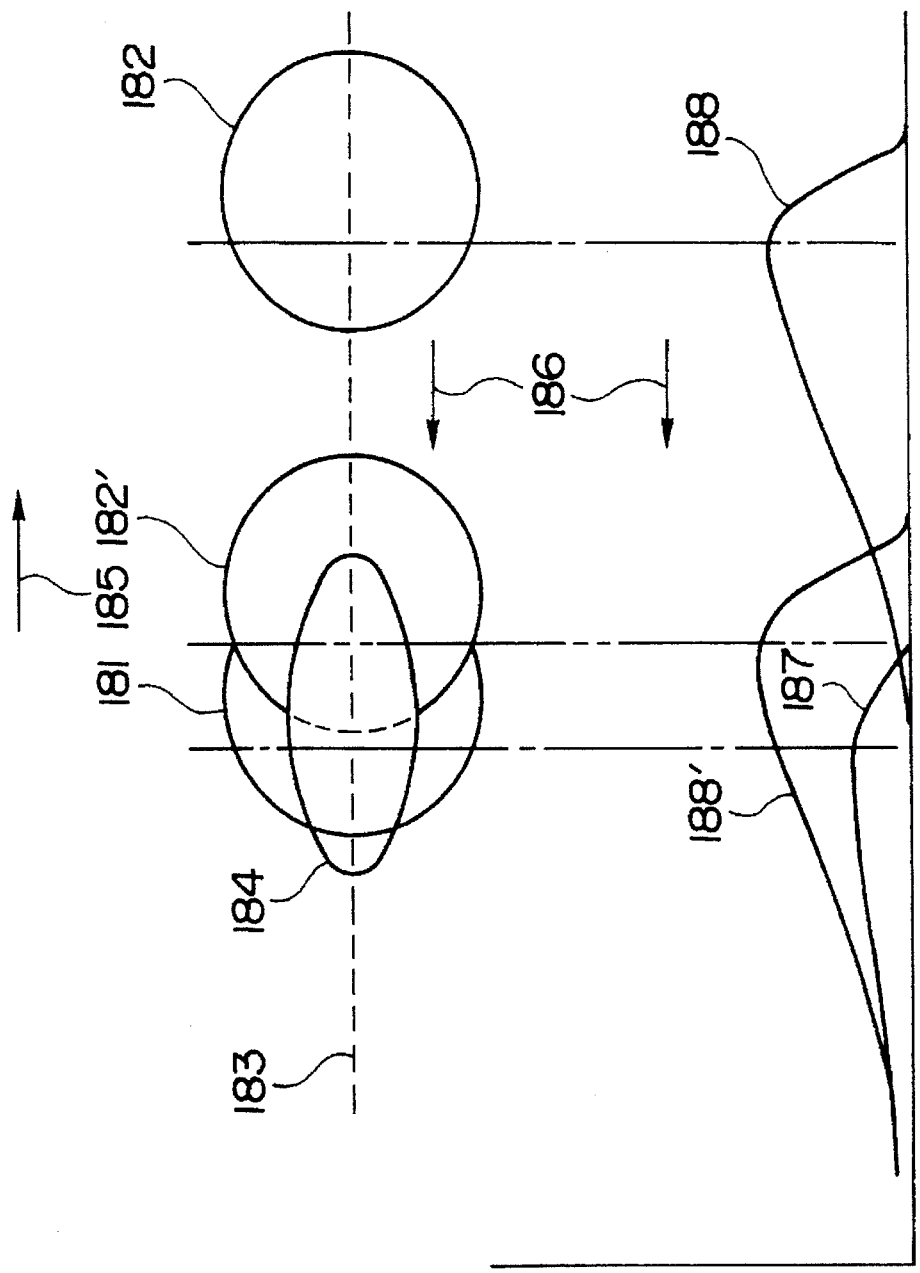
FIGS. 18A and 18B are diagrams for illustrating the control of the temperature distribution on a readout spot exercised by using two spots.

Another embodiment is shown in FIGS. 18A and 18B. A first light spot 181 is provided for signal detection. The light spot 181 has a constant intensity level. The temperature distribution on the medium caused by that level is set so as not to reach the temperature allowing the reproduction. A second light spot 182 is radiated onto a track 183 in a DC manner. A case of diffracted light tracking is shown as the track structure. The radiation light has a constant intensity level. The temperature distribution on the medium caused by that level is set so as to reach the temperature allowing the reproduction. Viewing the temperature distribution on coordinates centering around a moving light spot when the light spot and the medium move relatively at a constant speed, a high temperature portion 184 on the first and second light spots spreads backward toward a light spot travelling direction 185 so as to form an elliptic shape. The thermal distribution obtained when the second light spot 182 is brought near to the first light spot 181 in a direction indicated by an arrow 186 is shown in FIG. 18B. If a thermal distribution 188 caused by the first light spot 181 is brought near to a thermal distribution 187 caused by the second light spot 182, the thermal distribution 188 moves to the position of the thermal distribution 188'. That is to say, the high temperature portion is positioned in the center portion of the first light spot 181, and the temperature distribution on the first light spot 181 can be controlled. By using this way of thinking, it is possible to control the temperature position of a low temperature portion and reduce the waveform distortion even if a method of reading marks from the low temperature portion is used.

Figure 19A:
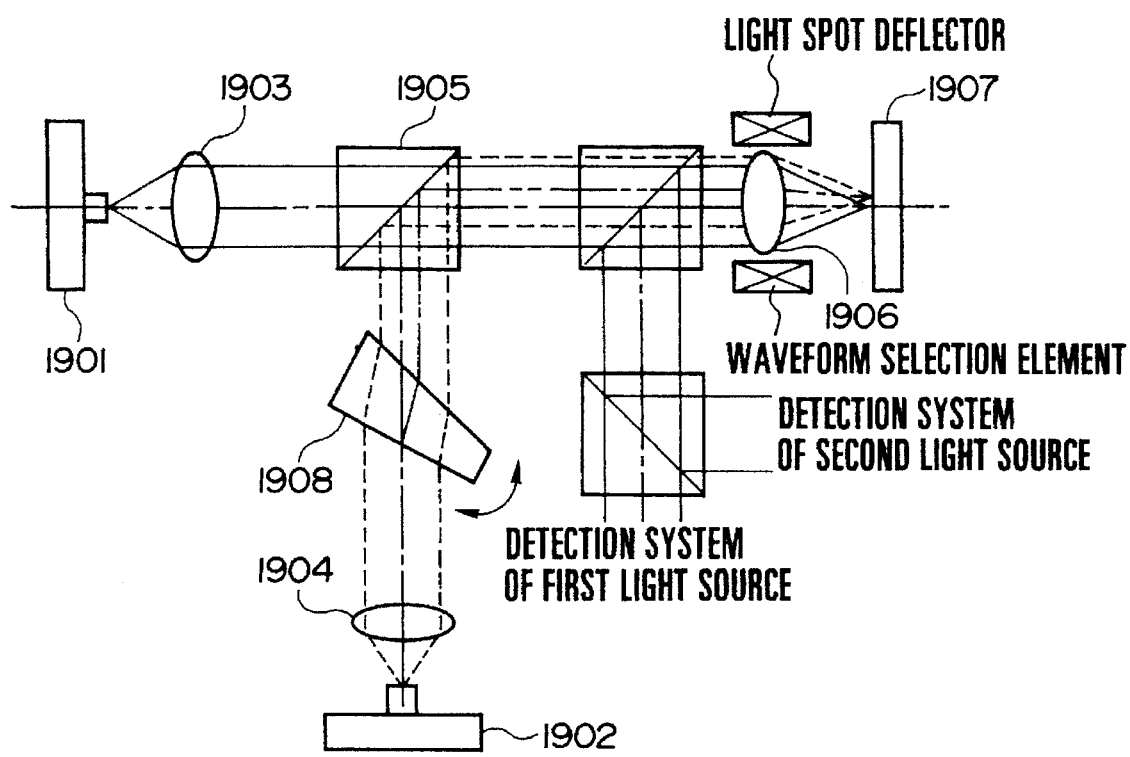
FIGS. 19A and 19B are diagrams illustrating a method for aligning positions of two spots in FIGS. 18A and 18B.
Figure 19B:
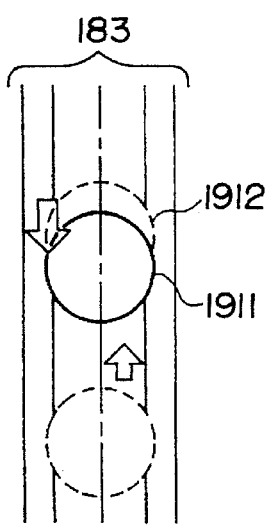

A method for aligning two spot positions is shown in FIGS. 19A and 19B. Light rays from two light sources 1901 and 1902 are converted to parallel rays by collimator lenses 1903 and 1904, respectively. They are combined by a prism 1905 and focused on a disk 1907 by an object lens 1906. In order to align positions of two spots, the position of the second spot can be moved relatively by rotating a wedge-shaped prism 1908 disposed in the optical path of the light source 1902 to vary the incident angle of luminous flux incident upon the object lens 1906. As a matter of course, a similar prism may be disposed in the light path of the first light source as well.

For knowing the positional relation between the two light spots 1911 and 1912, time when each light spot passes through a pit provided beforehand on the disk face shown in FIGS. 16A to 16C is observed. By using the moving speed and passing time of the light spots, positional relation between two light spots can be known. For knowing positions of the two light spots satisfying the above described relation of temperature distribution, a minute mark functioning as reference is reproduced while changing the space between the two light spots. A light spot space making the signal waveform quality at the time of reproduction best becomes a value whereto the light spot space should be set. In actual apparatuses, the space between the two light spots often varies due to various variation factors (such as disturbance like vibration, and electrical signal offset). Furthermore, the optimum space between two light spots is varied by the thermal characteristic of the medium as well. For absorbing the influence of these variation factors and attaining stable reproduction, it is desirable to set the spot space beforehand by using the result of reproducing the reference minute mark while changing the space between two spots before reproduction.

Figure 20:
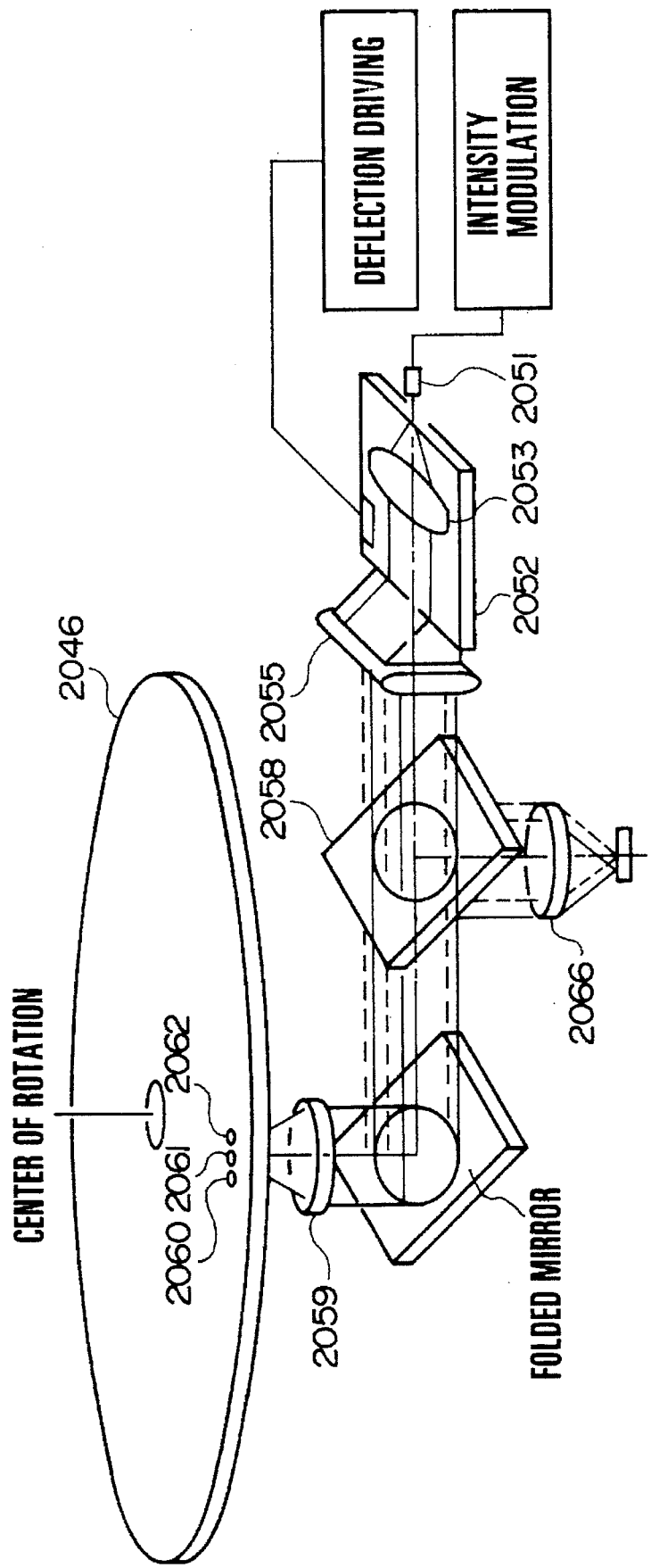
FIG. 20 is a diagram showing the configuration for controlling the positional relation of a light spot by using a surface acoustic wave.

Furthermore, if a method of controlling radiation positions of a plurality of spots and timing of intensity modulation is used, the temperature distribution can be effectively controlled in the same way as the above described case of two spots. FIG. 20 shows an apparatus employing surface acoustic waves (SAW) caused by an acoustooptic effect for producing a plurality of light spots. In FIG. 20, a plurality of spots 2060, 2061 and 2062 are produced on a disk face by a plurality of diffracted light beams which are in turn produced by carriers of a plurality of frequencies. By changing the difference between those frequencies, the positional relation of respective light spots is controlled. There is used such a characteristic that light passing through a waveguide 2052 is diffracted by a change caused in refractive index by a surface acoustic wave generated in the waveguide 2052 and hence the light is deflected. Besides, the present invention can also be realized by employing an acoustooptic deflection element using an ultrasonic wave. An example of an SAW element is shown in FIG. 21. In the structure shown in FIG. 21, luminous output of a laser 2051 is inputted to the waveguide 2052 and converted to parallel rays by a lens (geodesic lens) 2053 fabricated on the plane of the waveguide 2052, and the parallel rays are affected by the surface acoustic wave and deflected. By using this structure, the configuration is simple and small-sized as compared with a conventional element of this kind. Since this structure is described in detail in "Optical integrated circuit" written by Nishihara etc., description thereof will be omitted. (See p. 283 for the geodesic lens. See paragraph of optical spectrum analyzer of p. 362 for the configuration of the SAW element of the present embodiment.) Light emitted from the waveguide 2052 is outputted in a sheet shape. The shape of its luminous flux is transformed to a circular shape by a cylindrical lens 2055. The light is then passed through a luminous flux separation element 2058 and incident upon an object lens 2059. On an optical disk 2046, minute spots 2060, 2061 and 2062 are thus formed. These spots are disposed in the circumference direction of the disk so as to separate and deflect the light by an SAW deflection element. Reflected light from the disk separated in optical path from the incident light by the luminous flux separation element 2058 is led to a signal detection optical system 2066 to undergo signal detection for detection of the data signal and spot control.

Furthermore, modulation of intensities of respective spots 2060, 2061 and 2062 is attained by modulating power of each carrier to change the diffraction efficiency. For example, signals fed from oscillators 2101, 2102 and 2103 respectively generating center frequencies F1, F2 and F3 are respectively amplified by three power amplifiers 2163, 2164 and 2165, added in power, and supplied to an electrode 2056. A surface acoustic wave thus caused changes the diffraction efficiency of three spots. To the power amplifiers, signals s1, s2 and s3 for modulating intensities of respective spots are supplied. Positional relations of spots are sensed by the timing and amplitude shown in FIGS. 16A to 16C to modulate power. By superposing the temperature distribution produced by the spot modulated by the signal s1 upon the temperature distribution produced by the spot modulated by the signal s3, a temperature distribution similar to the thermal distribution 187 caused by the first spot 181 as shown in FIGS. 18A and 18B can be produced. In addition, by using SAW, a plurality of spot spaces can be electrically varied. At the same time, positional relations among those spots are mechanically maintained with accuracy and stability is attained.

If the recording method of optical disk and a medium according to the present invention are used, marks each having a width larger than its length can be recorded and reproduced without being affected by the influence of thermal interference by employing the recording method using light intensity modulation. Therefore, the recording density in the line direction can be improved while ensuring a sufficient large signal to noise ration. In addition, since overwriting with a high density is possible, the recording method of optical disk and a medium according to the present invention are also effective in attaining a higher speed.

The invention has been described with reference to the preferred and alternate embodiments. Obviously, modifications and alternations will occur to those of ordinary skill in the art upon reading and understanding the present invention. It is intended that the invention be construed as including all such modifications and alternations insofar they come with the scope of the appended claims or the equivalent thereof.

We claim:

1. An optical recording method of recording information by preparing a recording medium having a recording film on a substrate, radiating laser light from a light source to said recording film, and controlling a temperature distribution on said recording film, said optical recording method comprising the steps of:

forming a light spot having a predetermined intensity from said laser light;

radiating said light spot onto said recording film;

changing said predetermined intensity in keeping with a relative movement between said light spot and said recording medium; and recording a recording mark on said recording film, said recording mark having a ring-shaped based upon said predetermined intensity and a characteristic of said recording film.

2. An optical recording method according to claim 1, further comprising the step of weakening said predetermined intensity after the radiation of said light spot having said predetermined intensity and thereby overwriting a new recording mark on said recording mark.

3. An optical recording method according to claim 1, further comprising the step of making said predetermined intensity equal to zero after the radiation of said light spot having said predetermined intensity and thereby overwriting a new recording mark on said recording mark.

4. An optical recording method according to claim 1, wherein said recording medium comprises an optical magnetic disk, and said ring-shaped recording mark has a magnetization direction different from that of a remaining area encompassed thereby, and wherein information recorded in said ring-shaped recording mark is reproduced by using the Kerr effect, on the basis of reflected light for light radiated to said ring-shaped recording mark.

5. An optical recording method according to claim 1, wherein said recording film comprises a perpendicularly magnetized film having an easy axis of magnetization in a direction perpendicular to a surface of said recording film, and said ring-shaped recording mark is recorded by using a leakage field from magnetization around an area whereto said light spot has been radiated.

6. An optical recording method according to claim 5, wherein said perpendicularly magnetized film comprises a Pt/Co magnetic superlattice film.

7. An optical recording method according to claim 5, wherein said recording film has a three-layered structure comprising a first perpendicularly magnetized film, an in-plane magnetized film, and a second perpendicularly magnetized film stacked on said substrate in the order of mention, said first perpendicularly magnetized film comprising a recording layer having a function of capable of reversing magnetization according to information to be recorded, said second perpendicularly magnetized film comprising a bias layer having a predetermined magnetization direction, and said in-plane magnetized film comprising a switching layer for magnetically coupling said first and second perpendicularly magnetized films.

8. An optical recording method according to claim 7, wherein said first perpendicularly magnetized film comprises a TbFeCo amorphous thin film or a Pt/Co magnetic superlattice film, and said in-plane magnetized film comprises an oxide magnetic film or a nitride magnetic film, and wherein said second perpendicularly magnetized film comprises a TbCo amorphous thin film.

9. An optical recording method according to claim 1, wherein:

said recording medium comprises an optical magnetic disk;

said recording film has a four-layered structure comprising a first perpendicularly magnetized film, a second perpendicularly magnetized film, an in-plane magnetized film, and a third perpendicularly magnetized film stacked on said substrate in the order of mention;

said first perpendicularly magnetized film and said second perpendicularly magnetized film comprises a recording layer having a function of capable of reversing magnetization according to information to be recorded;

said first perpendicularly magnetized film is lower in Curie temperature than said second perpendicularly magnetized film;

a magnetization state of said second perpendicularly magnetized film is transcribed to said first perpendicularly magnetized film;

said third perpendicularly magnetized film comprises an initializing layer having a predetermined magnetization direction; and said in-plane magnetization film comprises a switching layer for magnetically coupling said second perpendicularly magnetized film with said third perpendicularly magnetized film.

10. An optical recording method according to claim 1, wherein:

said recording medium comprises a phase change optical magnetic disk;

said ring-shaped recording mark differs in phase state from a remaining area encompassed thereby, said ring-shaped recording mark being in a crystalline state, and said remaining area being in an amorphous state;

reflected light for light radiated to the area of said crystalline state and the area of said amorphous state are detected; and information is reproduced by using a difference in reflection factor between the area of said crystalline state and the area of said amorphous state.

11. An optical recording medium comprising:

a substrate;

a recording film disposed on said substrate;

said recording film comprising a first perpendicularly magnetized film, an in-plane magnetized film, and a second perpendicularly magnetized film stacked on said substrate in the order of mention;

said first perpendicularly magnetized film comprising a magnetic film for recording information in the form of magnetization reversal caused by a predetermined recording power and an external magnetic field;

said second perpendicularly magnetized film comprising a magnetic layer incapable of recording information with a predetermined recording power and an external magnetic field; and said in-plane magnetized film comprising a switching layer for magnetically coupling said first and second perpendicularly magnetized films at a predetermined temperature or above room temperature to thereby become entirely an in-plane magnetized film at a lower temperature than the predetermined temperature.

12. An optical recording medium according to claim 11, wherein said first perpendicularly magnetized film comprises a TbFeCo amorphous thin film or a Pt/Co magnetic superlattice film, and said in-plane magnetized film comprises an oxide magnetic film or a nitride magnetic film, and wherein said second perpendicularly magnetized film comprises a TbCo amorphous thin film.

13. A method of recording data on an optical recording medium, comprising the steps of:

irradiating an optical spot on the optical recording medium;

forming a temperature distribution on the optical recording medium in a range from a room temperature $T_R$ to maximum temperature $T_r$ with the optical spot;

forming a recording region on a portion of the optical recording medium having a temperature range from greater than a temperature $T_1$ up to less than a temperature $T_2$, wherein $(T_R < T_1 < T_2 < T_r)$; and forming a ring-shaped mark with the recording region to thereby record data.

* * * * *